US012574908B2

(12) United States Patent
Qu et al.

(10) Patent No.: US 12,574,908 B2
(45) Date of Patent: Mar. 10, 2026

(54) COMMUNICATION METHOD AND APPARATUS

(71) Applicant: HUAWEI TECHNOLOGIES CO., LTD., Shenzhen (CN)

(72) Inventors: Weilin Qu, Beijing (CN); Yubo Yang, Shanghai (CN); Jun Li, Shanghai (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 344 days.

(21) Appl. No.: 18/349,495

(22) Filed: Jul. 10, 2023

(65) Prior Publication Data

US 2023/0354278 A1     Nov. 2, 2023

Related U.S. Application Data

(63) Continuation of application No. PCT/CN2021/071138, filed on Jan. 11, 2021.

(51) Int. Cl.
*H04W 72/0446*     (2023.01)
*H04W 72/232*     (2023.01)

(52) U.S. Cl.
CPC ..... *H04W 72/0446* (2013.01); *H04W 72/232* (2023.01)

(58) Field of Classification Search
CPC .......... H04W 72/0446; H04W 72/232; H04W 72/1273; H04L 1/1854
See application file for complete search history.

(56) References Cited

U.S. PATENT DOCUMENTS

2018/0199338 A1* 7/2018 Nimbalker ............. H04W 74/02
2019/0313386 A1* 10/2019 Hwang ................. H04L 5/0094

OTHER PUBLICATIONS

3GPP TS 36.213 V10.0.1, 3rd Generation Partnership Project, Technical Specification Group Radio Access Network; Evolved Universal Terrestrial Radio Access (E-UTRA), Physical layer procedures (Release 10), Dec. 2010, total 98 pages.
Sierra Wireless: "Design considerations to support 14-HARQ Feature for LTE-M", 3GPP Draft; R1-2009124, 3rd Generation Partnership Project (3GPP), Mobile Competence Centre, 650, Route Des Lucioles; F-06921 Sophia-Antipolis Cedex; France, vol. RAN WG1, no. e-Meeting; Oct. 26, 2020-Nov. 13, 2020, Nov. 1, 2020 (Nov. 1, 2020), XP052351051, total 3 pages.

(Continued)

*Primary Examiner* — Dady Chery
(74) *Attorney, Agent, or Firm* — HAUPTMAN HAM, LLP

(57) ABSTRACT
A communication method includes receiving downlink control information (DCI), wherein the DCI is useable to indicate a second delay of uplink feedback information of a physical downlink shared channel scheduled by a physical downlink control channel, determining the second delay based on the-DCI, and sending, on a last uplink bandwidth reduced low complexity-coverage enhancement (BL/CE) subframe of Z uplink BL/CE subframes based on the second delay, the uplink feedback information corresponding to the physical downlink shared channel. The second delay includes the following subframes in sequence Y-Z-1 downlink (BL/CE) subframes, one subframe, and the Z uplink BL/CE subframes. Y is an integer greater than or equal to 4 and less than or equal to 13, and Z is an integer equal to 1, 2, or 3.

20 Claims, 14 Drawing Sheets

(56)       References Cited

OTHER PUBLICATIONS

ZTE, Support additional PDSCH scheduling delay for introduction of 14-HARQ processes in DL for eMTC, 3GPP TSG RAN WG1 #103-e, R1-208698, e-Meeting, Oct. 26-Nov. 13, 2020, total 4 pages.

Qualcomm Incorporated et al.: "Correction for HARQ-ACK delay in eMTC", 3GPP Draft; 36213_CR1157 (REL-15)_R1-1809654, 3rd Generation Partnership Project (3GPP), Mobile Competence Centre; 650, Route Des Lucioles; F-06921 Sophia-Antipolis Cedex; France, vol. RAN WG1, no. Gothenburg, Sweden; Aug. 20, 2018-Aug. 24, 2018, Sep. 9, 2018 (Sep. 9, 2018), XP051550903, total 2 pages.

Nokia, Nokia Shanghai Bell, Support of 14-HARQ processes in DL for eMTC, 3GPP TSG-RAN WG1 Meeting #103-e, R1-2008074, e-Meeting, Oct. 26-Nov. 13, 2020, total 8 pages.

"1 Text proposal for TS 36.212 2 Text proposals: Option 1 1.1 Text proposal for TS 36.213 7 Physical downlink shared channel related procedures", 3GPP Draft; TP Option 1, 3rd Generation Partnership Project 3GPP), Mobile Competence Centre; 650, Route Des Lucioles; F-06921 Sophia-Antipolis Cedex; France, vol. RAN WG1 Oct. 5, 2019 (Oct. 5, 2019), XP051789523, total 5 pages.

ZTE et al: "Discussion on UL HARQ-ACK feedback enhancement for MTC", 3GPP Draft; R1-1705484, 3rd Generation Partnership Project (3GPP), Mobile Competence Centre; 650, Route Des Lucioles; F-06921 Sophia-Antipolis Cedex; France, vol. RAN WG1,no. Spokane, USA; Apr. 3, 2017-Apr. 7, 2017, Mar. 24, 2017 (Mar. 24, 2017), XP051250940, total 3 pages.

International Search Report issued in corresponding International Application No. PCT/CN2021/071138, dated Sep. 23, 2021, pp. 1-10.

European Search Report issued in corresponding European Application No. 21916895.2, dated Dec. 18, 2023, pp. 1-18.

* cited by examiner

FIG. 1

| Subframe number | Machine type communication physical downlink control channel | Physical downlink shared channel | Physical uplink control channel |
|---|---|---|---|
| 32 | 2 | | | A2 |
| 31 | 1 | | | A1 |
| 30 | 0 | | | A0 |
| 29 | 9 | | | |
| 28 | 8 | M13 | D9 | |
| 27 | 7 | M12 | D8 | |
| 26 | 6 | M9 | D7 | |
| 25 | 5 | M8 | D6 | |
| 24 | 4 | M7 | D5 | |
| 23 | 3 | M6 | D4 | |
| 22 | 2 | M5 | D3 | |
| 21 | 1 | M4 | D2 | |
| 20 | 0 | M3 | D1 | |
| 19 | 9 | M2 | D0 | |
| 18 | 8 | M1 | D11 | |
| 17 | 7 | M0 | D10 | |
| 16 | 6 | | | |
| 15 | 5 | | | A2 |
| 14 | 4 | | | A1 |
| 13 | 3 | | | A0 |
| 12 | 2 | | | |
| 11 | 1 | M11 | D9 | |
| 10 | 0 | M10 | D8 | |
| 9 | 9 | M9 | D7 | |
| 8 | 8 | M8 | D6 | |
| 7 | 7 | M7 | D5 | |
| 6 | 6 | M6 | D4 | |
| 5 | 5 | M5 | D3 | |
| 4 | 4 | M4 | D2 | |
| 3 | 3 | M3 | D1 | |
| 2 | 2 | M2 | D0 | |
| 1 | 1 | M1 | D13 | |
| 0 | 0 | M0 | D12 | |

FIG. 2

| Number of a bit in a bitmap | 0 | 1 | 2 | 3 | 4 | 5 | 6 | 7 | 8 | 9 | 0 |
|---|---|---|---|---|---|---|---|---|---|---|---|
| Downlink bitmap | 1 | 1 | 0 | 1 | 1 | 1 | 0 | 1 | 0 | 1 | 1 |
| Uplink bitmap | 1 | 1 | 1 | 1 | 1 | 1 | 0 | 1 | 1 | 1 | 1 |
| Subframe number | 0 | 1 | 2 | 3 | 4 | 5 | 6 | 7 | 8 | 9 | 10 |

Physical downlink shared channel scheduling delay:
7 downlink BL/CE subframes

| Subframe number | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Machine type | 0 | 1 | 2 | 3 | 4 | 5 | 6 | 7 | 8 | 9 | 0 | 1 | 2 | 3 | 4 | 5 | 6 |
| Communication physical downlink control channel | M0 | M1 | M2 | M3 | M4 | M5 | M6 | M7 | M8 | M9 | M10 | M11 | | | | | |
| Physical downlink shared channel | D12 | D13 | D0 | D1 | D2 | D3 | D4 | D5 | D6 | D7 | D8 | D9 | | | | | |
| Physical uplink shared channel | | | | | | | | | | | | | | A0 | A1 | A2 | |

| Subframe number | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|
| Machine type | 7 | 8 | 9 | 0 | 1 | 2 | 3 | 4 | 5 | 6 | 7 | 8 | 9 | 0 | 1 | 2 | 3 | 4 | 5 |
| Communication physical downlink control channel | M12 | M0 | M1 | M2 | M3 | M4 | M5 | M6 | M7 | M8 | M13 | M9 | | ☐ | | | | M0 | M1 |
| Physical downlink shared channel | D10 | D11 | D12 | D0 | D1 | D2 | D3 | D4 | D5 | D6 | D7 | D8 | | | | | | D13 | ✕ |
| Physical uplink shared channel | | | | | | | | | | | | | | A0 | A1 | A2 | | | |

FIG. 3-2

| Number of a bit in a bitmap | 0 | 1 | 2 | 3 | 4 | 5 | 6 | 7 | 8 | 9 | 0 |
|---|---|---|---|---|---|---|---|---|---|---|---|
| Downlink bitmap | 1 | 1 | 0 | 1 | 1 | 1 | 0 | 1 | 0 | 1 | 1 |
| Uplink bitmap | 1 | 1 | 1 | 1 | 1 | 1 | 0 | 1 | 1 | 1 | 1 |
| Subframe number | 0 | 1 | 2 | 3 | 4 | 5 | 6 | 7 | 8 | 9 | 10 |

| Number of a bit in a bitmap | 0 | 1 | 2 | 3 | 4 | 5 | 6 | 7 | 8 | 9 | 0 |
|---|---|---|---|---|---|---|---|---|---|---|---|
| Downlink bitmap | 1 | 1 | 0 | 1 | 1 | 1 | 0 | 1 | 0 | 1 | 1 |
| Uplink bitmap | 1 | 1 | 1 | 1 | 1 | 1 | 0 | 1 | 1 | 1 | 1 |
| Subframe number | 0 | 1 | 2 | 3 | 4 | 5 | 6 | 7 | 8 | 9 | 10 |

COMMUNICATION METHOD AND APPARATUS

CROSS-REFERENCE TO RELATED APPLICATIONS

This application is a continuation of International Application No. PCT/CN2021/071138, filed on Jan. 11, 2021, the disclosure of which is hereby incorporated by reference in its entirety.

TECHNICAL FIELD

This application relates to the field of communication technologies, and in particular, to a communication method and apparatus.

BACKGROUND

To resist problems caused by signal fading and interference, a hybrid automatic repeat request (hybrid automatic repeat request, HARQ) technology is introduced in a mobile communication system. In the HARQ technology, a terminal receives downlink control information from a base station, and receives downlink data. The terminal further needs to feed back a hybrid automatic repeat request-acknowledgement (hybrid automatic repeat request-acknowledgement, HARQ-ACK) message or a hybrid automatic repeat request-negative acknowledgement (hybrid automatic repeat request-non-acknowledgement, HARQ-NACK) message through an uplink control channel, to indicate to the base station whether the downlink data is successfully transmitted.

Currently, the terminal may receive and send data by using 10 HARQ processes. With protocol evolution, the terminal may further support more HARQ processes, for example, may support 14 HARQ processes. How to improve resource utilization when more HARQ processes are supported becomes an urgent problem to be resolved.

SUMMARY

One or more embodiments of the present application provide a communication method and apparatus, to improve resource utilization.

To achieve the foregoing objective, one or more embodiments of the present application use the following technical solutions.

According to the first aspect, a communication method is provided. The method may be performed by a terminal device, or a component (for example, a chip system in a terminal device) that supports a function of the terminal device. For example, the method is performed by the terminal device, and the method includes the following steps.

The terminal device receives downlink control information, where the downlink control information indicates a first delay. The terminal device determines the first delay based on the downlink control information, and receives downlink data on a physical downlink shared channel based on the first delay.

The first delay includes five or six subframes, and the first delay includes a subframe type 1 or a subframe type 2. The subframe type 1 includes the following subframes in sequence: one downlink bandwidth reduced low complexity-coverage enhancement BL/CE subframe, one first subframe, X uplink BL/CE subframes, one second subframe, and one first downlink BL/CE subframe, and the first downlink BL/CE subframe is used to receive the physical downlink shared channel scheduled by a physical downlink control channel. The subframe type 2 includes the following subframes in sequence: the one first subframe, the X uplink BL/CE subframes, the one second subframe, the first downlink BL/CE subframe, and one second downlink BL/CE subframe, and the second downlink BL/CE subframe is used to receive the physical downlink shared channel scheduled by the physical downlink control channel, where X is 1 or 2.

According to the communication method provided in an embodiment of this application, a subframe type of a scheduled subframe may be indicated. In this way, an idle valid subframe can be used as much as possible, that is, resource utilization is improved, so that a peak rate at which the terminal device receives data can be improved as much as possible.

In some embodiments, the downlink control information indicates that the first delay includes five or six subframes, and indicates a subframe type of the first delay. In this way, the terminal device can learn, based on the downlink control information, a quantity of subframes included in the first delay and a corresponding subframe type, to receive the downlink data in a corresponding time unit through the physical downlink shared channel. In addition, compared with that a PDSCH scheduling delay is seven subframes, and the large scheduling delay results in a low peak rate of a terminal in the technology of some approaches, in the solution of this embodiment of this application, the first delay may be five subframes or six subframes, and a PDSCH scheduling delay is relatively short, so that a peak rate at which the terminal receives downlink data can be improved.

In some embodiments, the downlink control information further indicates a second delay, and the second delay includes Y subframes;

when X=1, the second delay includes the following subframes in sequence: Y1 downlink BL/CE subframes, one third subframe, two uplink BL/CE subframes, one fourth subframe, Y2 downlink BL/CE subframes, one fifth subframe, and Z uplink BL/CE subframes, where Y1, Y2, and Y are non-negative integers; Y is greater than or equal to 10, and Y is less than or equal to 17; and Z is 1, 2, or 3; and/or when X=2, the second delay includes the following subframes in sequence: Y3 downlink BL/CE subframes, one sixth subframe, one uplink BL/CE subframe, the one fourth subframe, the Y2 downlink BL/CE subframes, the one fifth subframe, and the Z uplink BL/CE subframes, where Y3, Y2, and Y are non-negative integers; Y is greater than or equal to 10, and Y is less than or equal to 16; and Z is 1, 2, or 3.

In some embodiments, the method further includes the following step.

The terminal device sends, on the last uplink BL/CE subframe of the Z uplink BL/CE subframes based on the second delay, an acknowledgement ACK message or a negative acknowledgement NACK message corresponding to the physical downlink shared channel.

According to a second aspect, this application provides a communication method. The method may be performed by a network device or a component (for example, a chip system in a network device) that supports a function of the network device. For example, the method is performed by the network device, and the method includes the following steps.

The network device sends downlink control information, and sends downlink data on a physical downlink shared channel based on a first delay. The downlink control information indicates the first delay, the first delay includes five or six subframes, and the first delay includes a subframe type 1 or a subframe type 2. The subframe type 1 includes the following subframes in sequence: one downlink bandwidth reduced low complexity-coverage enhancement BL/CE subframe, one first subframe, X uplink BL/CE subframes, one second subframe, and one first downlink BL/CE subframe, and the first downlink BL/CE subframe is used to receive the physical downlink shared channel scheduled by a physical downlink control channel. The subframe type 2 includes the following subframes in sequence: the one first subframe, the X uplink BL/CE subframes, the one second subframe, the first downlink BL/CE subframe, and one second downlink BL/CE subframe, and the second downlink BL/CE subframe is used to receive the physical downlink shared channel scheduled by the physical downlink control channel, where X is 1 or 2.

In some embodiments, the downlink control information indicates that the first delay includes five or six subframes, and indicates a subframe type of the first delay.

In some embodiments, the downlink control information further indicates a second delay, and the second delay includes Y subframes;

when X=1, the second delay includes the following subframes in sequence: Y1 downlink BL/CE subframes, one third subframe, two uplink BL/CE subframes, one fourth subframe, Y2 downlink BL/CE subframes, one fifth subframe, and Z uplink BL/CE subframes, where Y1, Y2, and Y are non-negative integers; Y is greater than or equal to 10, and Y is less than or equal to 17; and Z is 1, 2, or 3; and/or when X=2, the second delay includes the following subframes in sequence: Y3 downlink BL/CE subframes, one sixth subframe, one uplink BL/CE subframe, the one fourth subframe, the Y2 downlink BL/CE subframes, the one fifth subframe, and the Z uplink BL/CE subframes, where Y3, Y2, and Y are non-negative integers; Y is greater than or equal to 10, and Y is less than or equal to 16; and Z is 1, 2, or 3.

In some embodiments, the method further includes: The network device receives, on the last uplink BL/CE subframe of the Z uplink BL/CE subframes based on the second delay, an acknowledgement ACK message or a negative acknowledgement NACK message corresponding to the physical downlink shared channel.

According to a third aspect, this application provides a communication method. The method may be performed by a terminal device or a component (for example, a chip system in a terminal device) that supports a function of the terminal device. For example, the method is performed by the terminal device, and the method includes the following steps.

The terminal device receives downlink control information, determines a delay based on the downlink control information, and sends, on the last uplink BL/CE subframe of Z uplink BL/CE subframes based on the delay, uplink feedback information corresponding to a physical downlink shared channel.

The downlink control information indicates the delay; and the delay includes the following subframes in sequence: Y-Z-1 downlink bandwidth reduced low complexity-coverage enhancement BL/CE subframes, one subframe, and the Z uplink BL/CE subframes, where Y is an integer greater than or equal to 4 and less than or equal to 13, and Z is 1, 2, or 3.

According to a fourth aspect, this application provides a communication method. The method may be performed by a network device or a component (for example, a chip system in a network device) that supports a function of the network device. For example, the method is performed by the network device, and the method includes: The network device sends downlink control information, and receives, on the last uplink BL/CE subframe of Z uplink BL/CE subframes based on a delay, uplink feedback information corresponding to a physical downlink shared channel.

The downlink control information indicates the delay; and the delay includes the following subframes in sequence: Y-Z-1 downlink bandwidth reduced low complexity-coverage enhancement BL/CE subframes, one subframe, and the Z uplink BL/CE subframes, where Y is an integer greater than or equal to 4 and less than or equal to 13, and Z is 1, 2, or 3.

According to a fifth aspect, this application provides a communication method. The method may be performed by a terminal device or a component (for example, a chip system in a terminal device) that supports a function of the terminal device. For example, the method is performed by the terminal device, and the method includes the following steps.

The terminal device receives downlink control information, determines a delay based on the downlink control information, and sends uplink feedback information on the last uplink BL/CE subframe of Z uplink BL/CE subframes based on the delay.

The downlink control information indicates the delay. The delay includes the following subframes in sequence: Y4 downlink BL/CE subframes, one seventh subframe, one uplink BL/CE subframe, one eighth subframe, Y1 downlink BL/CE subframes, one third subframe, one uplink BL/CE subframe, one ninth subframe, Y3 downlink BL/CE subframes, one sixth subframe, one uplink BL/CE subframe, one fourth subframe, Y2 downlink BL/CE subframes, one fifth subframe, and the Z uplink BL/CE subframes, where Y4, Y1, Y3, Y2, and Y are non-negative integers, and Y is 21 or 22; and Z is 1, 2, or 3. Alternatively, the delay includes the following subframes in sequence: Y4 downlink BL/CE subframes, one seventh subframe, Y2 downlink BL/CE subframes, one fifth subframe, and the Z uplink BL/CE subframes, where Y4, Y2, and Y are non-negative integers; Y is greater than or equal to 11, and Y is less than or equal to 18; and Z is 1, 2, or 3.

According to a sixth aspect, this application provides a communication method. The method may be performed by a network device or a component (for example, a chip system in a network device) that supports a function of the network device. For example, the method is performed by the network device, and the method includes the following steps.

The network device sends downlink control information, where the downlink control information indicates a delay; and the network device receives uplink feedback information (ACK/NACK) on the last uplink BL/CE subframe of Z uplink BL/CE subframes based on the delay.

The delay includes the following subframes in sequence: Y4 downlink BL/CE subframes, one seventh subframe, one uplink BL/CE subframe, one eighth subframe, Y1 downlink BL/CE subframes, one third subframe, one uplink BL/CE subframe, one ninth subframe, Y3 downlink BL/CE subframes, one sixth subframe, one uplink BL/CE subframe, one fourth subframe, Y2 downlink BL/CE subframes, one fifth subframe, and the Z uplink BL/CE subframes, where Y4, Y1, Y3, Y2, and Y are non-negative integers, and Y is 21 or 22; and Z is 1, 2, or 3. Alternatively, the delay includes the following subframes in sequence: Y4 downlink BL/CE subframes, one seventh subframe, Y2 downlink BL/CE subframes, one fifth subframe, and the Z uplink BL/CE subframes, where Y4, Y2, and Y are non-negative integers; Y is greater than or equal to 11, and Y is less than or equal to 18; and Z is 1, 2, or 3.

According to a seventh aspect, this application provides a communication method. The method may be performed by a terminal device or a component (for example, a chip system in a terminal device) that supports a function of the terminal device. For example, the method is performed by the terminal device, and the method includes the following steps.

The terminal device receives downlink control information, determines a delay based on the downlink control information, and sends uplink feedback information on the last uplink BL/CE subframe of Z uplink BL/CE subframes based on the delay.

The downlink control information indicates the delay. The delay includes the following subframes in sequence: Y1 downlink BL/CE subframes, one third subframe, two uplink BL/CE subframes, one fourth subframe, Y2 downlink BL/CE subframes, one fifth subframe, and the Z uplink BL/CE subframes, where Y1, Y2, Y, and Z are non-negative integers; Y is greater than or equal to 10, and Y is less than or equal to 17; and Z is 1, 2, or 3.

According to an eighth aspect, this application provides a communication method. The method may be performed by a network device or a component (for example, a chip system in a network device) that supports a function of the network device. For example, the method is performed by the network device, and the method includes the following steps.

The network device sends downlink control information, where the downlink control information indicates a delay; and the network device sends uplink feedback information on the last uplink BL/CE subframe of Z uplink BL/CE subframes based on the delay.

The delay includes the following subframes in sequence: Y1 downlink BL/CE subframes, one third subframe, two uplink BL/CE subframes, one fourth subframe, Y2 downlink BL/CE subframes, one fifth subframe, and the Z uplink BL/CE subframes, where Y1, Y2, Y, and Z are non-negative integers; Y is greater than or equal to 10, and Y is less than or equal to 17; and Z is 1, 2, or 3.

According to a ninth aspect, this application provides a communication method. The method may be performed by a terminal device or a component (for example, a chip system in a terminal device) that supports a function of the terminal device. For example, the method is performed by the terminal device, and the method includes the following steps.

The terminal device receives downlink control information, determines a delay based on the downlink control information, and sends uplink feedback information on the last uplink BL/CE subframe of Z uplink BL/CE subframes based on the delay.

The downlink control information indicates the delay. The delay includes the following subframes in sequence: Y3 downlink BL/CE subframes, one sixth subframe, one uplink BL/CE subframe, one fourth subframe, Y2 downlink BL/CE subframes, one fifth subframe, and the Z uplink BL/CE subframes, where Y3, Y2, and Y are non-negative integers; Y is greater than or equal to 10, and Y is less than or equal to 16; and Z is 1, 2, or 3.

According to a tenth aspect, this application provides a communication method. The method may be performed by a network device or a component (for example, a chip system in a network device) that supports a function of the network device. For example, the method is performed by the network device, and the method includes the following steps.

The network device sends downlink control information, where the downlink control information indicates a delay; and the network device sends uplink feedback information on the last uplink BL/CE subframe of Z uplink BL/CE subframes based on the delay.

The delay includes the following subframes in sequence: Y3 downlink BL/CE subframes, one sixth subframe, one uplink BL/CE subframe, one fourth subframe, Y2 downlink BL/CE subframes, one fifth subframe, and the Z uplink BL/CE subframes, where Y3, Y2, and Y are non-negative integers; Y is greater than or equal to 10, and Y is less than or equal to 16; and Z is 1, 2, or 3.

According to an eleventh aspect, this application provides a communication method. The method may be performed by a network device or a component (for example, a chip system in a network device) that supports a function of the network device. For example, the method is performed by the network device, and the method includes the following steps.

The network device determines a delay set based on a configured bitmap, where the delay set includes a first delay and/or a second delay;

the network device sends indication information to a terminal device by using higher layer signaling, where the indication information indicates the delay set; and the network device sends downlink control information to the terminal device on a physical downlink control channel, where the downlink control information indicates the first delay and/or the second delay.

It can be learned that, when the DCI indicates a PDSCH scheduling delay and/or a HARQ-ACK delay to the terminal device, the DCI only needs indicate one or more elements in the delay set without indicating all elements in the delay set. Therefore, signaling overheads of the DCI can be reduced.

In some embodiments, the first delay is a delay of a physical downlink shared channel scheduled by the physical downlink control channel. The method further includes: The network device sends downlink data to the terminal device on the physical downlink shared channel based on the first delay.

In some embodiments, the second delay is a delay of uplink feedback information of the physical downlink shared channel scheduled by the physical downlink control channel. The method further includes: The network device receives the uplink feedback information from the terminal device based on the second delay.

In some embodiments, the higher layer signaling includes radio resource control RRC signaling or media access control MAC signaling.

In some embodiments, the first delay includes five, six, or seven subframes; the first delay includes a subframe type 1 or a subframe type 2; and the subframe type 1 includes the following subframes in sequence: one downlink bandwidth reduced low complexity-coverage enhancement BL/CE subframe, one first subframe, X uplink BL/CE subframes, one second subframe, and one first downlink BL/CE subframe, and the first downlink BL/CE subframe is used to receive the physical downlink shared channel scheduled by the physical downlink control channel; or the subframe type 2 includes the following subframes in sequence: the one first subframe, the X uplink BL/CE subframes, the one second subframe, the first downlink BL/CE subframe, and one second downlink BL/CE subframe, and the second downlink BL/CE subframe is used to receive the physical downlink shared channel scheduled by the physical downlink control channel, where X is 1, 2, or 3.

In some embodiments, the second delay includes Y subframes. When X=1, the second delay includes the following subframes in sequence: Y1 downlink BL/CE subframes, one third subframe, two uplink BL/CE subframes, one fourth subframe, Y2 downlink BL/CE subframes, one fifth subframe, and Z uplink BL/CE subframes, where Y1, Y2, and Y are non-negative integers; Y is greater than or equal to 10, and Y is less than or equal to 17; and Z is 1, 2, or 3; and/or when X=2, the second delay includes the following subframes in sequence: Y3 downlink BL/CE subframes, one sixth subframe, one uplink BL/CE subframe, the one fourth subframe, the Y2 downlink BL/CE subframes, the one fifth subframe, and the Z uplink BL/CE subframes, where Y3, Y2, and Y are non-negative integers; Y is greater than or equal to 10, and Y is less than or equal to 16; and Z is 1, 2, or 3.

In some embodiments, the first delay includes M consecutive downlink BL/CE subframes, where M is an integer greater than or equal to 2; and/or the second delay includes Y consecutive subframes, where Y is an integer greater than or equal to 4.

According to a twelfth aspect, this application provides a communication method. The method may be performed by a terminal device or a component (for example, a chip system in a terminal device) that supports a function of the terminal device. For example, the method is performed by the terminal device, and the method includes the following steps.

The terminal device receives higher layer signaling from a network device, where the higher layer signaling includes indication information, the indication information indicates a delay set, and the delay set includes a first delay and/or a second delay; and the terminal device receives downlink control information on a physical downlink control channel, where the downlink control information indicates the first delay and/or the second delay.

In some embodiments, the first delay is a delay of a physical downlink shared channel scheduled by the physical downlink control channel. The method further includes: The terminal device receives downlink data on the physical downlink shared channel based on the first delay.

In some embodiments, the second delay is a delay of uplink feedback information of the physical downlink shared channel scheduled by the physical downlink control channel. The method further includes: The terminal device sends the uplink feedback information based on the second delay.

In some embodiments, the higher layer signaling includes radio resource control RRC signaling or media access control MAC signaling.

In some embodiments, the first delay includes five, six, or seven subframes; the first delay includes a subframe type 1 or a subframe type 2; and the subframe type 1 includes the following subframes in sequence: one downlink bandwidth reduced low complexity-coverage enhancement BL/CE subframe, one first subframe, X uplink BL/CE subframes, one second subframe, and one first downlink BL/CE subframe, and the first downlink BL/CE subframe is used to receive the physical downlink shared channel scheduled by the physical downlink control channel; or the subframe type 2 includes the following subframes in sequence: the one first subframe, the X uplink BL/CE subframes, the one second subframe, the first downlink BL/CE subframe, and one second downlink BL/CE subframe, and the second downlink BL/CE subframe is used to receive the physical downlink shared channel scheduled by the physical downlink control channel, where X is 1, 2, or 3.

In some embodiments, the second delay includes Y subframes. When X=1, the second delay includes the following subframes in sequence: Y1 downlink BL/CE subframes, one third subframe, two uplink BL/CE subframes, one fourth subframe, Y2 downlink BL/CE subframes, one fifth subframe, and Z uplink BL/CE subframes, where Y1, Y2, and Y are non-negative integers; Y is greater than or equal to 10, and Y is less than or equal to 17; and Z is 1, 2, or 3; and/or when X=2, the second delay includes the following subframes in sequence: Y3 downlink BL/CE subframes, one sixth subframe, one uplink BL/CE subframe, the one fourth subframe, the Y2 downlink BL/CE subframes, the one fifth subframe, and the Z uplink BL/CE subframes, where Y3, Y2, and Y are non-negative integers; Y is greater than or equal to 10, and Y is less than or equal to 16; and Z is 1, 2, or 3.

In some embodiments, the first delay includes M consecutive downlink BL/CE subframes, where M is an integer greater than or equal to 2; and/or the second delay includes Y consecutive subframes, where Y is an integer greater than or equal to 4.

According to a thirteenth aspect, this application provides a communication apparatus. The apparatus may be a terminal device or a component (for example, a chip system in a terminal device) that supports a function of the terminal device. The apparatus includes a transceiver module and a processing module. The transceiver module may perform receiving and sending processing in any method according to the first aspect, and the processing module may perform processing other than the receiving and sending processing in any method according to the first aspect.

For example, the transceiver module may be configured to receive downlink control information, where the downlink control information indicates a first delay; the first delay includes five or six subframes, and the first delay includes a subframe type 1 or a subframe type 2; the subframe type 1 includes the following subframes in sequence: one downlink bandwidth reduced low complexity-coverage enhancement BL/CE subframe, one first subframe, X uplink BL/CE subframes, one second subframe, and one first downlink BL/CE subframe, and the first downlink BL/CE subframe is used to receive a physical downlink shared channel scheduled by a physical downlink control channel; and the subframe type 2 includes the following subframes in sequence: the one first subframe, the X uplink BL/CE subframes, the one second subframe, the first downlink BL/CE subframe, and one second downlink BL/CE subframe, and the second downlink BL/CE subframe is used to receive the physical downlink shared channel scheduled by the physical downlink control channel, where X is 1 or 2; and the processing module may be configured to determine the first delay based on the downlink control information, and receive downlink data on the physical downlink shared channel based on the first delay via the transceiver module.

According to a fourteenth aspect, this application provides a communication apparatus. The apparatus may be a network device or a component (for example, a chip system in a network device) that supports a function of the network device. The apparatus includes a transceiver module and a processing module. The transceiver module may perform receiving and sending processing in any method according to the second aspect, and the processing module may perform processing other than the receiving and sending processing in any method according to the second aspect.

For example, the transceiver module may be configured to send downlink control information, where the downlink control information indicates a first delay; the first delay includes five or six subframes, and the first delay includes a subframe type 1 or a subframe type 2; the subframe type 1 includes the following subframes in sequence: one downlink bandwidth reduced low complexity-coverage enhancement BL/CE subframe, one first subframe, X uplink BL/CE subframes, one second subframe, and one first downlink BL/CE subframe, and the first downlink BL/CE subframe is used to receive a physical downlink shared channel scheduled by a physical downlink control channel; and the subframe type 2 includes the following subframes in sequence: the one first subframe, the X uplink BL/CE subframes, the one second subframe, the first downlink BL/CE subframe, and one second downlink BL/CE subframe, and the second downlink BL/CE subframe is used to receive the physical downlink shared channel scheduled by the physical downlink control channel, where X is 1 or 2; and the processing module may be further configured to send downlink data on the physical downlink shared channel based on the first delay via the transceiver module.

According to a fifteenth aspect, this application provides a communication apparatus. The apparatus may be a terminal device or a component (for example, a chip system in a terminal device) that supports a function of the terminal device. The apparatus includes a transceiver module and a processing module. The transceiver module may perform receiving and sending processing in any method according to the third aspect, and the processing module may perform processing other than the receiving and sending processing in any method according to the third aspect.

For example, the transceiver module may be configured to receive downlink control information, where the downlink control information indicates a delay; and the delay includes the following subframes in sequence: Y-Z-1 downlink bandwidth reduced low complexity-coverage enhancement BL/CE subframes, one subframe, and Z uplink BL/CE subframes, where Y is an integer greater than or equal to 4 and less than or equal to 13, and Z is 1, 2, or 3; and the processing module may be configured to determine the delay based on the downlink control information, and send, on the last uplink BL/CE subframe of the Z uplink BL/CE subframes based on the delay via the transceiver module, uplink feedback information corresponding to a physical downlink shared channel.

According to a sixteenth aspect, this application provides a communication apparatus. The apparatus may be a network device or a component (for example, a chip system in a network device) that supports a function of the network device. The apparatus includes a transceiver module and a processing module. The transceiver module may perform receiving and sending processing in any method according to the fourth aspect, and the processing module may perform processing other than the receiving and sending processing in any method according to the fourth aspect.

For example, the transceiver module may be configured to send downlink control information, where the downlink control information indicates a delay; and the delay includes the following subframes in sequence: Y-Z-1 downlink bandwidth reduced low complexity-coverage enhancement BL/CE subframes, one subframe, and Z uplink BL/CE subframes, where Y is an integer greater than or equal to 4 and less than or equal to 13, and Z is 1, 2, or 3; and the processing module may be further configured to receive, on the last uplink BL/CE subframe of the Z uplink BL/CE subframes based on the delay via the transceiver module, uplink feedback information corresponding to a physical downlink shared channel.

According to a seventeenth aspect, this application provides a communication apparatus. The apparatus may be a terminal device or a component (for example, a chip system in a terminal device) that supports a function of the terminal device. The apparatus includes a transceiver module and a processing module. The transceiver module may perform receiving and sending processing in any method according to the fifth aspect, and the processing module may perform processing other than the receiving and sending processing in any method according to the fifth aspect.

For example, the transceiver module may be configured to receive downlink control information; and the processing module may be configured to determine a delay based on the downlink control information, and send uplink feedback information on the last uplink BL/CE subframe of Z uplink BL/CE subframes based on the delay via the transceiver module.

The downlink control information indicates the delay. The delay includes the following subframes in sequence: Y4 downlink BL/CE subframes, one seventh subframe, one uplink BL/CE subframe, one eighth subframe, Y1 downlink BL/CE subframes, one third subframe, one uplink BL/CE subframe, one ninth subframe, Y3 downlink BL/CE subframes, one sixth subframe, one uplink BL/CE subframe, one fourth subframe, Y2 downlink BL/CE subframes, one fifth subframe, and the Z uplink BL/CE subframes, where Y4, Y1, Y3, Y2, and Y are non-negative integers, and Y is 21 or 22; and Z is 1, 2, or 3. Alternatively, the delay includes the following subframes in sequence: Y4 downlink BL/CE subframes, one seventh subframe, Y2 downlink BL/CE subframes, one fifth subframe, and the Z uplink BL/CE subframes, where Y4, Y2, and Y are non-negative integers; Y is greater than or equal to 11, and Y is less than or equal to 18; and Z is 1, 2, or 3.

According to an eighteenth aspect, this application provides a communication apparatus. The apparatus may be a network device or a component (for example, a chip system in a network device) that supports a function of the network device. The apparatus includes a transceiver module and a processing module. The transceiver module may perform receiving and sending processing in any method according to the sixth aspect, and the processing module may perform processing other than the receiving and sending processing in any method according to the sixth aspect.

For example, the transceiver module may be configured to send downlink control information, where the downlink control information indicates a delay; and the processing module may be configured to receive uplink feedback information (ACK/NACK) in the last uplink BL/CE subframe of the Z uplink BL/CE subframes based on the delay via the transceiver module.

The delay includes the following subframes in sequence: Y4 downlink BL/CE subframes, one seventh subframe, one uplink BL/CE subframe, one eighth subframe, Y1 downlink BL/CE subframes, one third subframe, one uplink BL/CE subframe, one ninth subframe, Y3 downlink BL/CE subframes, one sixth subframe, one uplink BL/CE subframe, one fourth subframe, Y2 downlink BL/CE subframes, one fifth subframe, and the Z uplink BL/CE subframes, where Y4, Y1, Y3, Y2, and Y are non-negative integers, and Y is 21 or 22; and Z is 1, 2, or 3. Alternatively, the delay includes the following subframes in sequence: Y4 downlink BL/CE subframes, one seventh subframe, Y2 downlink BL/CE subframes, one fifth subframe, and the Z uplink BL/CE subframes, where Y4, Y2, and Y are non-negative integers; Y is greater than or equal to 11, and Y is less than or equal to 18; and Z is 1, 2, or 3.

According to a nineteenth aspect, this application provides a communication apparatus. The apparatus may be a terminal device or a component (for example, a chip system in a terminal device) that supports a function of the terminal device. The apparatus includes a transceiver module and a processing module. The transceiver module may perform receiving and sending processing in any method according to the seventh aspect, and the processing module may perform processing other than the receiving and sending processing in any method according to the seventh aspect.

For example, the transceiver module may be configured to receive downlink control information; and the processing module may be configured to determine a delay based on the downlink control information, and send uplink feedback information on the last uplink BL/CE subframe of Z uplink BL/CE subframes based on the delay via the transceiver module.

The downlink control information indicates the delay. The delay includes the following subframes in sequence: Y1 downlink BL/CE subframes, one third subframe, two uplink BL/CE subframes, one fourth subframe, Y2 downlink BL/CE subframes, one fifth subframe, and the Z uplink BL/CE subframes, where Y1, Y2, Y, and Z are non-negative integers; Y is greater than or equal to 10, and Y is less than or equal to 17; and Z is 1, 2, or 3.

According to a twentieth aspect, this application provides a communication apparatus. The apparatus may be a network device or a component (for example, a chip system in a network device) that supports a function of the network device. The apparatus includes a transceiver module and a processing module. The transceiver module may perform receiving and sending processing in any method according to the eighth aspect, and the processing module may perform processing other than the receiving and sending processing in any method according to the eighth aspect.

For example, the transceiver module may be configured to send downlink control information, where the downlink control information indicates a delay; and the processing module may be configured to send uplink feedback information on the last uplink BL/CE subframe of Z uplink BL/CE subframes based on the delay via the transceiver module.

The delay includes the following subframes in sequence: Y1 downlink BL/CE subframes, one third subframe, two uplink BL/CE subframes, one fourth subframe, Y2 downlink BL/CE subframes, one fifth subframe, and the Z uplink BL/CE subframes, where Y1, Y2, Y, and Z are non-negative integers; Y is greater than or equal to 10, and Y is less than or equal to 17; and Z is 1, 2, or 3.

According to a twenty-first aspect, this application provides a communication apparatus. The apparatus may be a terminal device or a component (for example, a chip system in a terminal device) that supports a function of the terminal device. The apparatus includes a transceiver module and a processing module. The transceiver module may perform receiving and sending processing in any method according to the ninth aspect, and the processing module may perform processing other than the receiving and sending processing in any method according to the ninth aspect.

For example, the transceiver module may be configured to receive downlink control information; and the processing module may be configured to determine a delay based on the downlink control information, and send uplink feedback information on the last uplink BL/CE subframe of Z uplink BL/CE subframes based on the delay via the transceiver module.

The downlink control information indicates the delay. The delay includes the following subframes in sequence: Y3 downlink BL/CE subframes, one sixth subframe, one uplink BL/CE subframe, one fourth subframe, Y2 downlink BL/CE subframes, one fifth subframe, and the Z uplink BL/CE subframes, where Y3, Y2, and Y are non-negative integers; Y is greater than or equal to 10, and Y is less than or equal to 16; and Z is 1, 2, or 3.

According to a twenty-second aspect, this application provides a communication apparatus. The apparatus may be a network device or a component (for example, a chip system in a network device) that supports a function of the network device. The apparatus includes a transceiver module and a processing module. The transceiver module may perform receiving and sending processing in any method according to the tenth aspect, and the processing module may perform processing other than the receiving and sending processing in any method according to the tenth aspect.

For example, the transceiver module may be configured to send downlink control information, where the downlink control information indicates a delay; and the processing module may be configured to send uplink feedback information on the last uplink BL/CE subframe of Z uplink BL/CE subframes based on the delay via the transceiver module.

The delay includes the following subframes in sequence: Y3 downlink BL/CE subframes, one sixth subframe, one uplink BL/CE subframe, one fourth subframe, Y2 downlink BL/CE subframes, one fifth subframe, and the Z uplink BL/CE subframes, where Y3, Y2, and Y are non-negative integers; Y is greater than or equal to 10, and Y is less than or equal to 16; and Z is 1, 2, or 3.

According to a twenty-third aspect, this application provides a communication apparatus. The apparatus may be a network device or a component (for example, a chip system in a network device) that supports a function of the network device. The apparatus includes a transceiver module and a processing module. The transceiver module may perform receiving and sending processing in any method according to the eleventh aspect, and the processing module may perform processing other than the receiving and sending processing in any method according to the eleventh aspect.

For example, the processing module may be configured to determine a delay set based on a configured bitmap, where the delay set includes a first delay and/or a second delay;

the transceiver module may be configured to send indication information to a terminal device by using higher layer signaling, where the indication information indicates the delay set; and the transceiver module may be further configured to send downlink control information to the terminal device on a physical downlink control channel, where the downlink control information indicates the first delay and/or the second delay.

According to a twenty-fourth aspect, this application provides a communication apparatus. The apparatus may be a terminal device or a component (for example, a chip system in a terminal device) that supports a function of the terminal device. The apparatus includes a transceiver module and a processing module. The transceiver module may perform receiving and sending processing in any method according to the twelfth aspect, and the processing module may perform processing other than the receiving and sending processing in any method according to the twelfth aspect.

For example, the transceiver module may be configured to receive higher layer signaling from a network device, where the higher layer signaling includes indication information, the indication information indicates a delay set, and the delay set includes a first delay and/or a second delay; and the transceiver module may be further configured to receive downlink control information on a physical downlink control channel, where the downlink control information indicates the first delay and/or the second delay.

According to a twenty-fifth aspect, a communication apparatus is provided. The apparatus has a function of implementing the method in any design of the foregoing aspects. The function may be implemented by hardware, or may be implemented by hardware executing corresponding software. The hardware or the software includes one or more modules corresponding to the function.

According to a twenty-sixth aspect, a communication apparatus is provided. The apparatus includes a processor and a memory. The memory is configured to store a computer-executable instruction; and when the apparatus runs, the processor executes the computer-executable instruction stored in the memory, so that the apparatus performs the communication method in any design of the foregoing aspects.

According to a twenty-seventh aspect, a communication apparatus is provided. The apparatus includes a processor. The processor is configured to: after being coupled to a memory and reading instructions in the memory, perform, based on the instructions, the communication method in any design of the foregoing aspects.

According to a twenty-eighth aspect, a computer-readable storage medium is provided. The computer-readable storage medium stores instructions; and when the instructions are run on a computer, the computer is enabled to perform the communication method in any design of the foregoing aspects.

According to a twenty-ninth aspect, a computer program product including instructions is provided. When the instructions are run on a computer, the computer is enabled to perform the communication method in any design of the foregoing aspects.

According to a thirtieth aspect, a chip system is provided. The chip system includes a processor, configured to support a communication apparatus in implementing functions in any one of the foregoing aspects. In some embodiments, the chip system further includes a memory. The memory is configured to store a program instruction and data that are necessary for a terminal. The chip system may include a chip, or may include a chip and another discrete component.

According to a thirty-first aspect, a communication system is provided. The communication system includes the network device in the foregoing aspects and the terminal device in the foregoing aspects.

BRIEF DESCRIPTION OF DRAWINGS

FIG. 1 is a schematic diagram of a 10-HARQ-process system according to an embodiment of this application;

FIG. 2 is a schematic diagram of a 14-HARQ-process system according to an embodiment of this application;

FIG. 3-1 and FIG. 3-2 are schematic diagrams of representation of a delay based on a quantity of downlink BL/CE subframes according to an embodiment of this application;

FIG. 4-1, FIG. 4-2, and FIG. 4-3 are schematic diagrams of representation of a delay based on a subframe type according to an embodiment of this application;

FIG. 8-1 is a schematic diagram 1 of an application scenario of a communication method according to an embodiment of this application;

FIG. 8-2 is a schematic diagram 2 of an application scenario of a communication method according to an embodiment of this application;

DETAILED DESCRIPTION

Figures 1, 3:
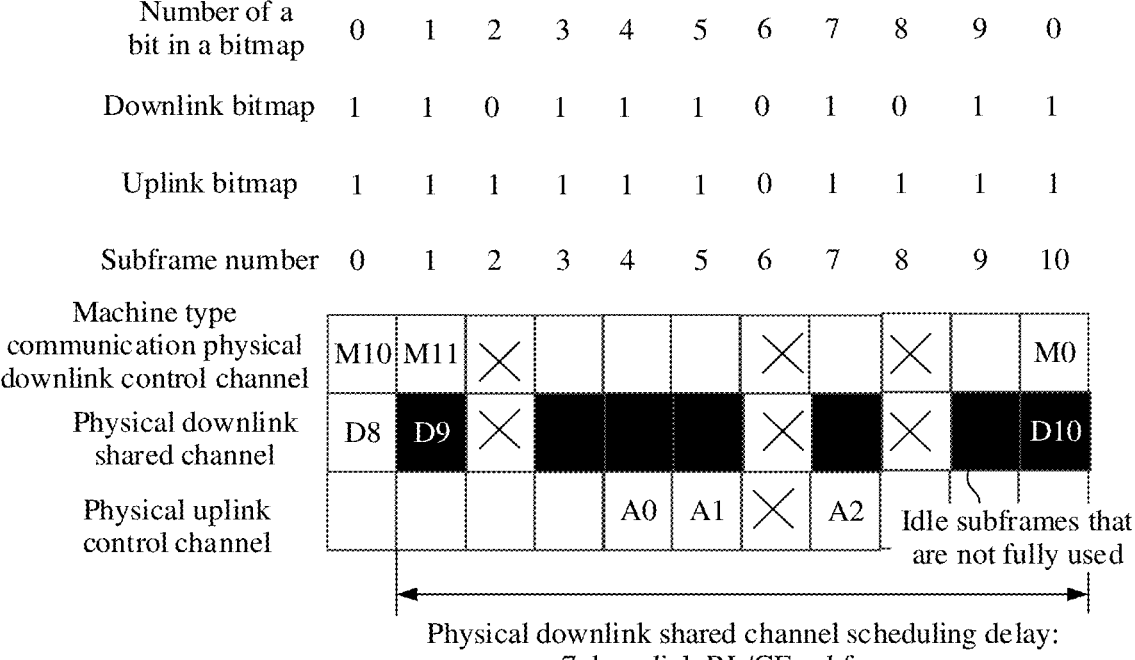

First, some technical terms used in embodiments of this application are described.

1. Repetition Number Field

Usually, 14 HARQ processes are mainly applied to a scenario in which a coverage condition is good. In this case, information transmitted by a terminal device can be successfully transmitted without being retransmitted for a plurality of times. Accordingly, a base station may probably configure, for the terminal device, for example, a small repetition number of PDSCH transmissions, or may not configure a repetition number for the terminal device. The base station mainly configures a repetition number of the terminal device by using DCI. Specifically, the base station sends the DCI to the terminal device, where the DCI includes a repetition number field, for example, the field indicates a repetition number of PDSCH transmissions of the terminal device.

2. HARQ-ACK Field (Also Referred to as HARQ-ACK Delay Field, HARQ-ACK Delay Field)

The HARQ-ACK field is included in DCI, and may indicate a HARQ-ACK delay. The HARQ-ACK delay is described below.

3. A physical downlink shared channel (physical downlink shared channel, PDSCH) scheduling delay may be understood as a delay from a physical downlink control channel (physical downlink control channel, PDCCH) subframe to a PDSCH subframe scheduled by the PDCCH subframe, or may be referred to as a delay of a PDCCH-scheduled PDSCH. For example, a time unit may be, but is not limited to, one or a combination of a plurality of the following time units: a frame, a subframe, a symbol, a valid frame, a valid subframe, a valid symbol, an absolute frame, an absolute subframe, an absolute symbol, and a bandwidth reduced low complexity-coverage enhancement (bandwidth reduced low complexity-coverage enhancement, BL/CE) subframe. For example, refer to FIG. 1. M0 to M9 are 10 PDCCH subframes for PDSCH scheduling. D0 to D9 are 10 PDSCH subframes scheduled by M0 to M9. A delay of the PDSCH subframe D0 scheduled by the PDCCH subframe M0 is two downlink BL/CE subframes, that is, a PDSCH scheduling delay corresponding to D0 is two downlink BL/CE subframes.

4. A HARQ-ACK delay is a delay between a PDSCH subframe scheduled by a PDCCH subframe and a PUCCH subframe scheduled by the PDCCH subframe. In other words, a HARQ-ACK delay is a delay between a PDSCH subframe and a PUCCH subframe for feeding back whether the PDSCH subframe is successfully received and decoded, or a HARQ-ACK delay is understood as a delay of PDCCH-scheduled uplink feedback information. For example, still refer to FIG. 1. A subframe A0 feeds back whether subframes D0 to D3 are successfully received and decoded. A subframe A1 feeds back whether subframes D4 to D7 are successfully received and decoded. A subframe A2 feeds back whether subframes D8 and D9 are successfully received and decoded. A delay between the PDSCH subframe D0 and the subframe A0 that feeds back uplink feedback information is 13−2=11, that is, a HARQ-ACK delay corresponding to the subframe D0 is 11 subframes. This means that: A terminal needs to wait for duration of 11 subframes from a time point at which the subframe D0 is received to a time point at which the subframe A0 feeds back whether data carried in the subframe D0 is successfully received and decoded.

5. HARQ Process

Each of a terminal device and a network device includes a HARQ entity, and the HARQ entity maintains a specified quantity of HARQ processes. Each HARQ process has a corresponding identifier. The terminal device or the network device may receive and send corresponding data by using the HARQ process. When a HARQ process is waiting for acknowledgement information, the terminal device or the network device may send data by using another HARQ process.

For example, as shown in FIG. 1, a subframe M0 to a subframe M9 are scheduling subframes (namely, subframes for scheduling downlink data) respectively corresponding to a process 0 to a process 9, and a subframe D0 to a subframe D9 are data subframes (namely, subframes for carrying the downlink data) respectively corresponding to the process 0 to the process 9. After the terminal device sends uplink feedback information of the subframe D0 to the subframe D3 to a base station on a subframe A0, the base station may learn, based on the uplink feedback information, whether downlink data scheduled in the process 0 to the process 3 is successfully transmitted and is decoded by the terminal device. Then, the base station may continue to schedule downlink data by using the process 0 to the process 3. For example, if the terminal device feeds back, to the base station, an ACK corresponding to the subframe D0, the base station may learn, based on the ACK, that downlink data scheduled in the process 0 is successfully received and decoded by the terminal device. Therefore, the base station may schedule a new downlink data block process 0-D0 by using the PDCCH M0. For another example, if the terminal device feeds back, to the base station, a NACK corresponding to the subframe D1, the base station may learn, based on the NACK, that downlink data scheduled in the process 1 fails to be received or correctly decoded by the terminal device. Therefore, the base station may schedule a new downlink data block process 1-D1 by using the PDCCH M1.

6. a 10-HARQ-Process System is a System in which a Terminal and a Network Device Implement Communication by Using 10 HARQ Processes.

In the 10-HARQ-process system, a supported PDSCH scheduling delay is two downlink BL/CE subframes, and a supported HARQ-ACK delay ranges from 4 subframes to 11 subframes. At the same time, in the 10-HARQ-process system, there is a problem of resource waste. Still as shown in FIG. 1, the subframe D0 and the subframe D1 are not used to transmit downlink data, which causes resource waste to some extent. To improve resource utilization, a 14-HARQ process is introduced into the industry.

Figures 1, 2, 4:
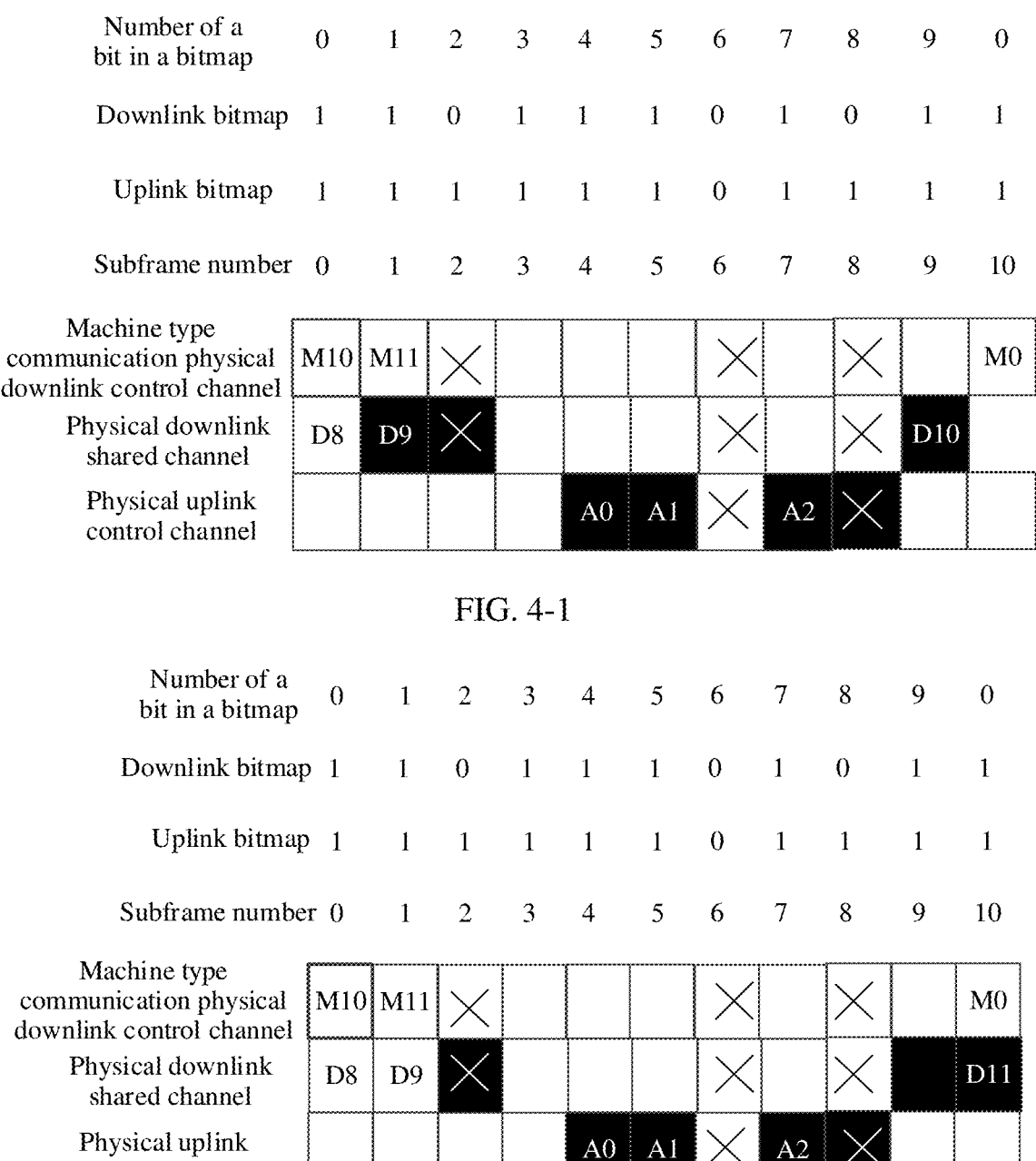
Figures 3, 4:
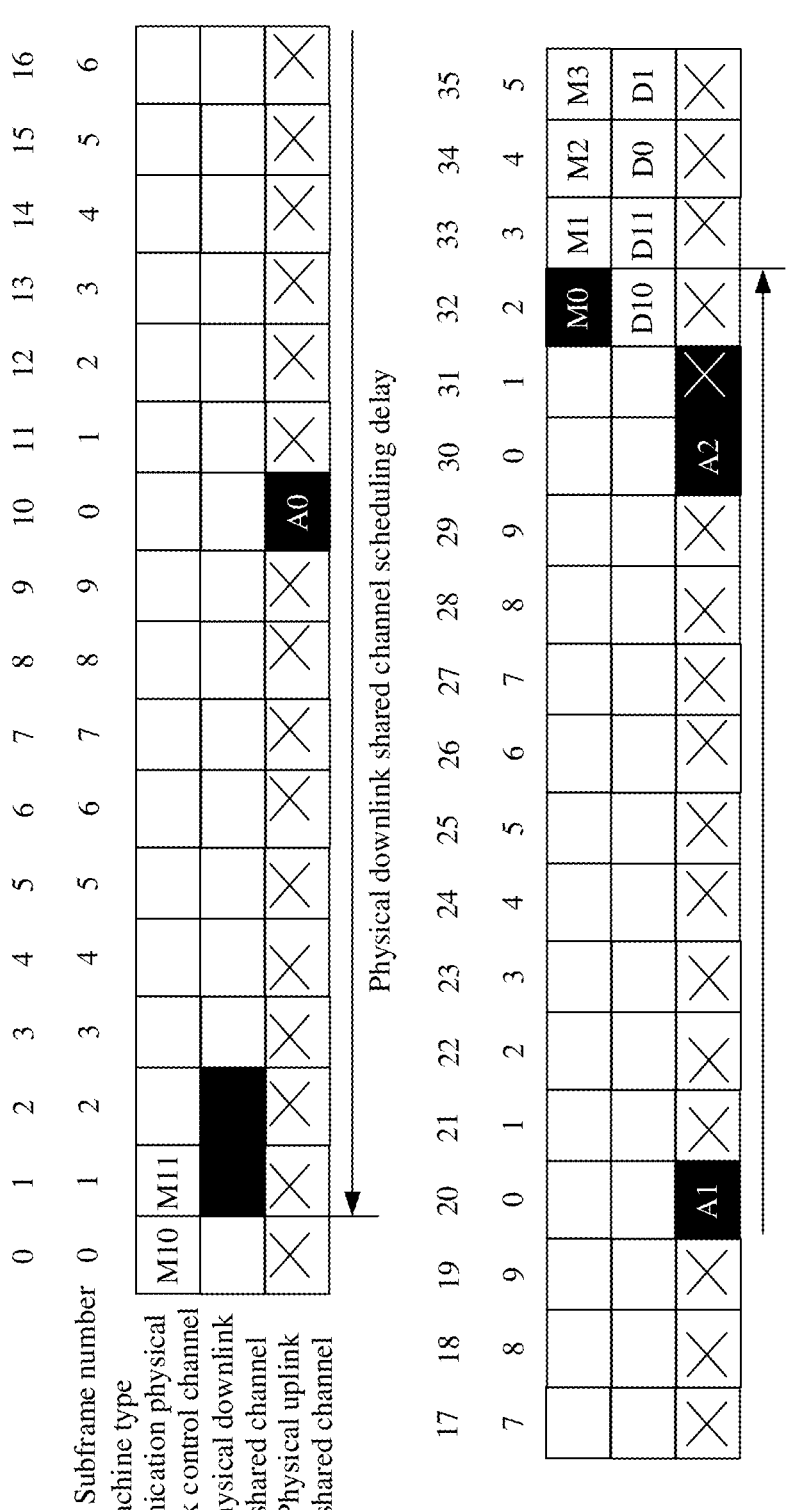

7. A 14-HARQ process is a process in which a terminal performs a HARQ by using 14 HARQ processes. As shown in FIG. 2, M10 to M13 are PDCCH subframes respectively corresponding to four HARQ processes newly introduced on a downlink control channel. Downlink data scheduled by the subframe M10 is transmitted on a subframe D10 (namely, a subframe 17), and downlink data scheduled by a subframe M11 is transmitted on a subframe D11 (namely, a subframe 18). Uplink feedback information (ACK or NACK) corresponding to the subframe D10 and uplink feedback information corresponding to the subframe D11 are transmitted on a subframe 30. In a subframe 27 and a subframe 28, because the uplink feedback information corresponding to the subframe D10 and the uplink feedback information corresponding to the subframe D11 have not been transmitted, a base station does not know whether the terminal successfully receives and decodes D10 and D11. Therefore, the base station does not send the subframe M10 for scheduling the subframe D10 and the subframe M11 for scheduling the subframe D11, but sends the subframe M12 for scheduling the subframe D12 and the subframe M13 for scheduling the subframe D13.

Still as shown in FIG. 2, compared with that a subframe 0 and a subframe 1 are not fully utilized in a scenario in which 10 HARQ processes are introduced on a downlink control channel, in a scenario in which 14 HARQ processes are used in the downlink control channel, the subframe 0 and the subframe 1 may also be used to transmit downlink data, and therefore, a system transmission rate is improved. For example, in some cases, the system transmission rate is increased by about 20%.

8. BL/CE Terminal Device and BL/CE Subframe

A terminal device of an enhanced machine type communication (enhanced machine type communication, eMTC) type may also be referred to as a BL/CE terminal device. Usually, the terminal device of this type requires that a coverage capability is improved and terminal complexity is reduced on a premise that a small bandwidth is used. A BL/CE subframe is introduced to meet communication requirements of the terminal of this type. An eMTC terminal device receives and sends information on a BL/CE subframe. The BL/CE subframe may be referred to as a valid subframe corresponding to BL/CE UE. The BL/CE subframe is classified into an uplink BL/CE subframe and a downlink BL/CE subframe.

In a possible implementation, in a 14-HARQ-process system, a base station may schedule a maximum of 12 PDSCH subframes each time, and feed back uplink feedback information corresponding to the 12 PDSCH subframes after scheduling of the 12 PDSCH subframes is completed. For example, still refer to FIG. 2. The base station may schedule 12 PDSCH subframes, namely, a subframe D12, a subframe D13, and a subframe D0 to a subframe D9, and send uplink feedback information of the 12 PDSCH subframes on a subframe A0, a subframe A1, and a subframe A2.

9. Solution of Indicating a Delay Based on a Quantity of Consecutive Downlink BL/CE Subframes It can be understood that, when 14 HARQ processes are introduced, a PDSCH scheduling delay and a HARQ-ACK delay of a legacy system in which 10 HARQ processes are used are not applicable to a system in which 14 HARQ processes are used. Therefore, a PDSCH scheduling delay and a HARQ-ACK delay applicable to the system in which 14 HARQ processes are used need to be provided. In a possible implementation, Table 1 may be used to indicate the PDSCH scheduling delay, and Table 2 may be used to indicate the HARQ-ACK delay.

TABLE 1

| HARQ-ACK delay field | HARQ ID | PDSCH scheduling delay |
|---|---|---|
| 000 | 10 | 2 |
| 001 | 10 | 7 |
| 010 | 11 | 2 |
| 011 | 11 | 7 |
| 100 | 12 | 2 |
| 101 | 12 | 7 |
| 110 | 13 | 2 |
| 111 | 13 | 7 |

TABLE 2

| HARQ ID field | HARQ-ACK delay |
|---|---|
| 10 | 4 |
| 11 | 5 |
| 12 | 7 |
| 13 | 9 |
| 14 | 11 |
| 15 | 13 |

The HARQ-ACK delay field and the HARQ ID field are included in downlink control information (downlink control information, DCI).

In the foregoing solution of indicating a delay (including the PDSCH scheduling delay and the HARQ-ACK delay) in a system in which 10 processes are used and indicating a delay in a 14-HARQ-process system, a specific delay is usually indicated by indicating a quantity of consecutive downlink BL/CE subframes or a quantity of consecutive subframes. The PDSCH scheduling delay is used as an example. As shown in FIG. 2, a PDSCH scheduling delay between a subframe M10 and a subframe D10 is seven consecutive subframes, and the seven consecutive subframes all are downlink BL/CE subframes. In other words, the PDSCH scheduling delay is indicated by indicating a quantity 7 of the downlink BL/CE subframes.

However, when a base station configures non-BL/CE subframes, a delay is indicated by indicating a quantity of consecutive downlink BL/CE subframes, which may cause a problem of resource waste.

For example, refer to FIG. 3-1. An uplink bitmap configured by the base station for a terminal is 1111110111, and a downlink bitmap configured by the base station for the terminal is 1101110101. Each bit in the bitmap corresponds to a subframe, and a subframe corresponding to a bit whose bit value is 0 is a non-BL/CE subframe. For example, a subframe corresponding to a value 1 is a BL/CE subframe. It can be learned that, in a downlink direction, a downlink subframe 2, a downlink subframe 6, and a downlink subframe 8 that are configured by the base station for the terminal are all non-BL/CE subframes. In an uplink direction, an uplink subframe 6 configured by the base station for the terminal is a non-BL/CE subframe. In FIG. 3-1, subframes marked with crosses represent non-BL/CE subframes. According to the solution of indicating a delay by indicating a quantity of consecutive downlink BL/CE subframes, for example, a PDSCH scheduling delay is seven consecutive downlink BL/CE subframes, and a delay between a subframe D10 scheduled by a subframe M10 and the subframe M10 (that is, a delay of the subframe D10 scheduled by the subframe M10) needs to be seven consecutive downlink BL/CE subframes. To be specific, the delay needs to include a subframe 1, a subframe 3 to a subframe 5, a subframe 7, a subframe 9, and a subframe 10 that are indicated by black blocks. In this way, the subframe D10 is located in the subframe 10. However, it can be learned from FIG. 3-1 that the subframe 9 is an idle subframe, and the idle subframe is not used to send the subframe D10. As a result, resources are idle, resource utilization is low, and a peak rate at which the terminal receives data is low.

It should be noted that, in a bitmap configuration manner, every 10 subframes usually correspond to a same bitmap. Still refer to FIG. 1. Subframes numbered 0 to 9 correspond to a bitmap 1, and subframes numbered from 0 to 9 in the next period still correspond to the bitmap 1. In this specification, for convenience of counting, subframes may be renumbered. For example, subframes numbered 0 to 9 in a second period in FIG. 1 are renumbered to 10 to 19. It should be understood that a specific subframe numbering manner does not affect implementation of technical solutions in embodiments of this application, and the embodiments of this application are applicable to scenarios of different numbering manners.

For another example, refer to FIG. 3-2. A subframe D12 scheduled by a subframe M12 is a subframe 0 (where the subframe M12 is before the subframe 0, and a delay between the subframe M12 and the subframe 0 may be seven subframes). In some cases, the terminal fails to correctly decode downlink data in the subframe D12, that is, the downlink data scheduled in a process 12 fails to be decoded, so that the terminal may send NACK to the base station on a subframe 13 according to the technology of some approaches. After receiving the NACK, the base station needs to reschedule, by using the process 12, a PDCCH subframe (namely, the subframe M12) corresponding to the process 12, to retransmit the downlink data corresponding to the process 12. In FIG. 3-2, the terminal retransmits the subframe M12 on a subframe 17. Correspondingly, because a delay of a PDSCH scheduled by a PDCCH currently is two subframes, the subframe D12 scheduled by the retransmitted M12 needs to be located on a subframe 19. In some cases, as shown in FIG. 3-2, a subframe M9 may be located on a subframe 28 of the PDCCH. In this case, D9 scheduled by M9 needs to be located on the subframe 30 of the PDSCH. In a time division multiplexing scenario, if the subframe 30 is used to receive downlink data on the subframe D9, the subframe 30 cannot be used to simultaneously send ACK/NACK. It can be learned that, to avoid affecting the sending of the ACK/NACK by the terminal device on the subframe 30, the subframe 28 of the PDCCH needs to be idle. In this way, there is no scheduling of the subframe 28 of the PDCCH, and the subframe 30 is correspondingly idle. The terminal device may send the ACK/NACK on the subframe 30.

10. Subframe Type-Based Delay Indication Solution

In the radio access network (radio access network, RAN) 1 #103-e conference of the 3$^{rd}$ generation partnership project (3rd generation partnership project, 3GPP), considering that there is a downlink non-BL/CE subframe and an uplink non-BL/CE subframe, it is proposed in the industry that a PDSCH scheduling delay includes seven subframes. Specifically, the PDSCH scheduling delay includes two subframe types. A subframe type 1 is defined as: one downlink BL/CE subframe, one subframe of any type, three uplink BL/CE subframes, one subframe of any type, and one downlink BL/CE subframe. A subframe type 2 is defined as: one subframe of any type, three uplink BL/CE subframes, one subframe of any type, and two downlink BL/CE subframes. The uplink BL/CE subframe is a valid uplink BL/CE subframe, namely, an uplink subframe on which BL/CE UE can send data, for example, an uplink subframe on which the BL/CE UE can send uplink feedback information.

In a possible implementation, DCI includes a repetition field and a HARQ-ACK delay field. Two indication fields, namely, a repetition field and a HARQ-ACK delay field, in the DCI may jointly indicate two subframe types of the PDSCH scheduling delay and a corresponding HARQ-ACK delay.

For example, refer to FIG. 4-1, a PDSCH scheduling delay corresponding to a subframe M10 is used as an example, and a PDSCH scheduling delay corresponding to M0 is a subframe type 1. Specifically, starting from the subframe M10, the PDSCH scheduling delay includes the following subframes in sequence: one downlink BL/CE subframe (for example, a subframe 1 of a PDSCH), one subframe of any type (for example, a subframe 2 of the PDSCH), three uplink BL/CE subframes (for example, a subframe 4, a subframe 5, and a subframe 7 of a PUCCH that are used to feed back uplink feedback information), one subframe of any type (for example, a subframe 8 of the PUCCH), and one downlink BL/CE subframe (for example, a subframe 9 of the PDSCH). In other words, subframes indicated by black blocks are counted. In this case, it may be learned that a subframe D10 scheduled by the subframe M10 is on the subframe 9.

For another example, a PDSCH scheduling delay of D11 scheduled by M11 is of the subframe type 2. Refer to FIG. 4-2. Starting from the subframe M11, the PDSCH scheduling delay includes the following subframes (namely, subframes indicated by black blocks) in sequence: one subframe of any type (for example, a subframe 2 of a PDSCH), three uplink BL/CE subframes (for example, a subframe 4, a subframe 5, and a subframe 7 of a PUCCH that are used to feed back uplink feedback information), one subframe of any type (for example, a subframe 8 of the PUCCH), and two downlink BL/CE subframes (for example, a subframe 9 and a subframe 10 of the PDSCH). In this case, it may be learned that a subframe D11 scheduled by the subframe M10 is on the subframe 10.

It can be learned that, in some cases, resource utilization can be improved to some extent in a manner of indicating a PDSCH scheduling delay by using the foregoing two subframe types. For example, in comparison with that the subframe 9 is not used to transmit downlink data in the technical solution in FIG. 3-1, in the technical solution in FIG. 4-1, the subframe 9 may be used to transmit downlink data. However, when the base station configures a large quantity of uplink non-BL/CE subframes for the terminal, a phenomenon of resource waste may still exist. For example, refer to FIG. 4-3. In some cases, a proportion of uplink non-BL/CE subframes (namely, uplink subframes marked with crosses) is large, and a proportion of downlink non-BL/CE subframes is small, so that there are many downlink BL/CE subframes between A0, A1, and A2 (for example, downlink subframes 11 to 19 between A0 and A1 are all downlink BL/CE subframes). In this case, the PDSCH scheduling delay is of the foregoing subframe type 1. After scheduling a subframe 0 and a subframe 1, the base station needs to perform next downlink data scheduling at least on a subframe 32. It can be learned that, in addition to a subframe 4 and a subframe 3, there are still a large quantity of idle subframes that are not scheduled, and resource utilization is low.

To further improve resource utilization in a 14-HARQ-process (or similar to multi-HARQ-process) system, embodiments of this application provide a communication method. The method is applicable to a system in which a BL/CE subframe exists, for example, a long term evolution (long term evolution, LTE) system, a narrow band Internet of Things (narrow band internet of things, NB-IoT) system, a global system for mobile communication (global system for mobile communication, GSM), a universal mobile telecommunications system (universal mobile telecommunications system, UMTS), a code division multiple access (Code division multiple access, CDMA) system, a 5$^{th}$ generation mobile communication system (5th generation system), and a future evolved communication system. This specification mainly uses the LTE system as an example for description.

Figure 5:
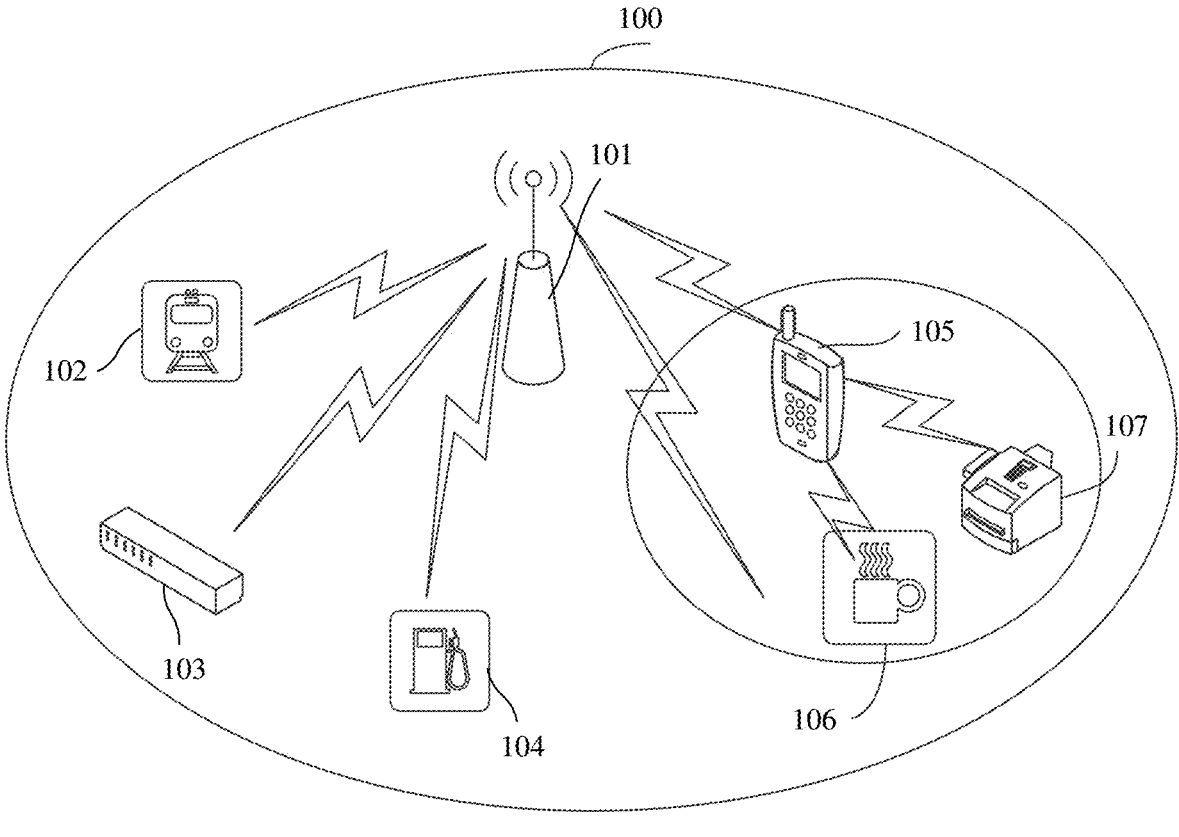
FIG. 5 is a schematic diagram of an architecture of a communication system according to an embodiment of this application.

FIG. 5 shows an example of an architecture of a communication system to which the technical solutions of embodiments of this application are applicable. As shown in FIG. 5, the communication system 100 includes a network device 101 and terminal devices (for example, a terminal device 102 to a terminal device 107 that are shown).

The network device and the terminal devices may communicate with each other by using, for example, a radio access technology. The terminal devices may communicate with each other by using a wireless or wired connection.

The terminal device in embodiments of this application may be a device that provides a user with voice and/or data services, a device with a radio connection function, or another processing device connected to a radio modem. A form of the terminal device is not limited to a handheld type. The terminal device may communicate with one or more core networks through a RAN. The terminal device may be a mobile terminal, for example, a mobile phone (or referred to as a "cellular" phone), a mobile computer, or a portable, pocket-sized, handheld, computer built-in, or vehicle-mounted communication apparatus, which may exchange voices and/or data with the RAN. The terminal device may alternatively be a device such as a personal communication service (personal communication service, PCS) phone, a cordless phone, a session initiation protocol (session initiation protocol, SIP) phone, a wireless local loop (wireless local loop, WLL) station, or a personal digital assistant (personal digital assistant, PDA). The terminal device may alternatively be a subscriber unit (subscriber unit), a subscriber station (subscriber station), a mobile station (mobile station), a mobile console (mobile), a remote station (remote station), an access point (access point), a remote terminal (remote terminal), an access terminal (access terminal), a user terminal (user terminal), a user agent (user agent), a user device (user device), or user equipment (user equipment, UE). A type and a specific implementation form of the terminal device are not limited in embodiments of this application.

The network device in embodiments of the present invention may connect the terminal device to one or more core networks. In some embodiments the network device may be further configured to perform mutual conversion between a frame received through an air interface and an IP packet, so that the terminal device can interact with, for example, an IP network device. The network device may further perform attribute management on the air interface. For example, the network device may be a base transceiver station (base transceiver station, BTS) in a GSM or CDMA technology, or may be a NodeB (NodeB) in wideband code division multiple access (wideband code division multiple access, WCDMA), or may be an evolved NodeB (evolutional Node B, eNB or e-NodeB) in LTE. The network device may alternatively be a transmission reception point (transmission reception point, TRP), a relay station, an access point, or the like. A type and an implementation form of the network device are not limited in embodiments of this application.

In the example shown in FIG. 5, the terminal device 102 is a vehicle, the terminal device 103 is an intelligent air conditioner, the terminal device 104 is an intelligent tanker, the terminal device 105 is a mobile phone, the terminal device 106 is a smart teacup, and the terminal device 107 is a printer. Certainly, as described above, a specific implementation form of the terminal device is not limited in this embodiment of this application.

It should be noted that FIG. 5 is merely an example of a communication system to which the technical solutions of embodiments of this application are applicable.

The following describes the technical solutions in embodiments of this application with reference to the accompanying drawings in embodiments of this application. In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, unless otherwise specified, "a plurality of" means two or more than two. In addition, to clearly describe the technical solutions in embodiments of this application, terms such as "first" and "second" are used in embodiments of this application to distinguish between same items or similar items that have same or similar functions and purposes. A person skilled in the art may understand that the terms such as "first" and "second" do not limit a quantity or an execution sequence, and the terms such as "first" and "second" do not indicate a definite difference.

In addition, a network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Figures 6, 7:
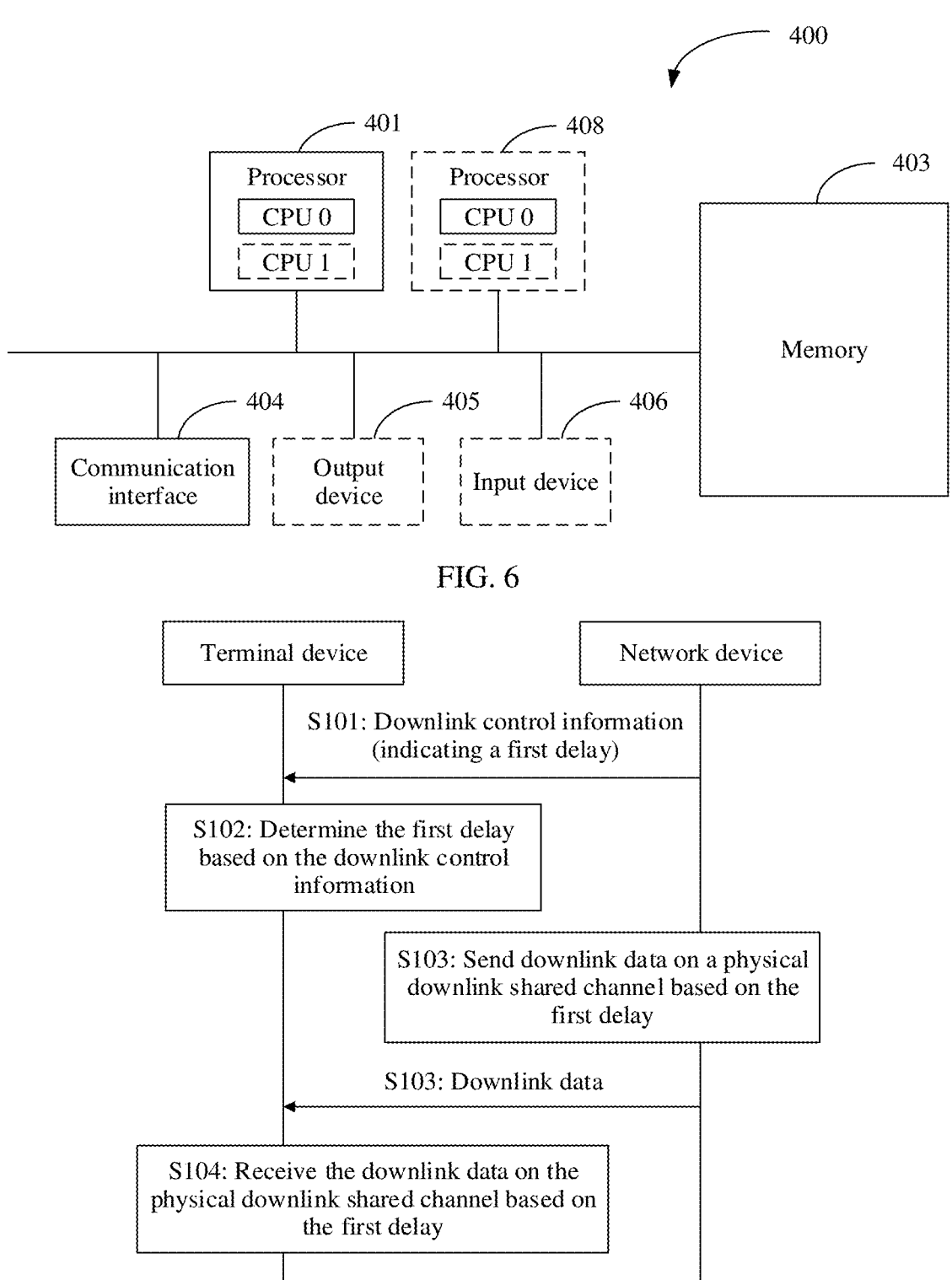
FIG. 6 is a schematic diagram of a structure of a communication device according to an embodiment of this application.
FIG. 7 is a schematic flowchart 1 of a communication method according to an embodiment of this application.

In some embodiments the terminal device or the network device in embodiments of this application may be implemented by different devices. For example, the terminal device or the network device in embodiments of this application may be implemented by using a communication device in FIG. 6. FIG. 6 is a schematic diagram of a hardware structure of the communication device according to an embodiment of this application. The communication device 400 includes at least one processor 401, a memory 403, and at least one communication interface 404.

The processor 401 may be a general-purpose central processing unit (central processing unit, CPU), a micro-processor, an application-specific integrated circuit (application-specific integrated circuit, ASIC), or one or more integrated circuits configured to control program execution of the solutions in this application.

The foregoing components may include a path to transmit information between the foregoing components.

The communication interface 404 uses any transceiver-type apparatus, and is configured to communicate with another device or a communication network such as Ethernet, a radio access network (radio access network, RAN), or a wireless local area network (wireless local area network, WLAN).

The memory 403 may be a read-only memory (read-only memory, ROM) or another type of static storage device that can store static information and instructions, or a random access memory (random access memory, RAM) or another type of dynamic storage device that can store information and instructions. Alternatively, the memory 403 may be an electrically erasable programmable read-only memory (electrically erasable programmable read-only memory, EEPROM), a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 403 is not limited thereto. The memory may exist independently, and is connected to the processor through a communication line. Alternatively, the memory may be integrated into the processor.

The memory 403 is configured to store computer-executable instructions for performing the solutions in this application, and the processor 401 controls execution. The processor 401 is configured to execute the computer-executable instructions stored in the memory 403, to implement the communication method provided in the foregoing embodiments of this application.

In some embodiments the computer-executable instructions in this embodiment of this application may also be referred to as application program code. This is not specifically limited in this embodiment of this application.

During specific implementation, in an embodiment, the processor 401 may include one or more CPUs, for example, a CPU 0 and a CPU 1 in FIG. 6.

During specific implementation, in an embodiment, the communication device 400 may include a plurality of processors, for example, the processor 401 and a processor 408 in FIG. 6. Each of these processors may be a single-core processor (single-CPU), or may be a multi-core processor (multi-CPU). The processor herein may be one or more devices, circuits, and/or processing cores configured to process data (for example, computer program instructions).

During specific implementation, in an embodiment, the communication device 400 may further include an output device 405 and an input device 406. The output device 405 communicates with the processor 401, and may display information in a plurality of manners. For example, the output device 405 may be a liquid crystal display (liquid crystal display, LCD), a light emitting diode (light emitting diode, LED) display device, a cathode ray tube (cathode ray tube, CRT) display device, or a projector (projector). The input device 406 communicates with the processor 401, and may receive an input of a user in a plurality of manners. For example, the input device 406 may be a mouse, a keyboard, a touchscreen device, or a sensor device.

The communication device 400 may be a general-purpose device or a dedicated device. During specific implementation, the communication device 400 may be a device with a structure similar to that in FIG. 6. A type of the communication device 400 is not limited in this embodiment of this application.

The following describes in detail the communication method provided in embodiments of this application with reference to FIG. 1 to FIG. 6.

It should be noted that in the following embodiments of this application, names of messages between network elements, names of parameters in messages, or the like are merely examples, and there may be other names during specific implementation. This is not specifically limited in embodiments of this application.

The communication method provided in embodiments of this application is applicable to a system in which 14 HARQ processes are used. In some embodiments if a terminal device supports 14 HARQ processes, the terminal device may send capability information to a base station. The capability information indicates that the terminal device can support 14 HARQ processes. After receiving the capability information from the terminal device, the base station may determine, based on a current channel condition, whether to configure 14 HARQ processes for the terminal device. For example, when a channel condition is good, the base station may configure 14 HARQ processes for the terminal device for use, that is, the base station enables a 14-HARQ process function of the terminal device, and the terminal device may use the 14 HARQ processes to improve a data peak rate. When the channel condition is poor, the base station may disable (disable) the 14-HARQ process function of the terminal device by using higher layer signaling, for example, a radio resource control (radio resource control, RRC) reconfiguration message.

In some embodiments the terminal device supporting the 14 HARQ processes may be a terminal device of various protocol versions, for example, may be a terminal device of a R17 version (that is, a 5G technology is used). A specific protocol version number of the terminal device is not limited in embodiments of this application.

An embodiment of this application provides a communication method. As shown in FIG. 7, the method includes the following steps.

S101: A network device sends DCI to a terminal device.

Correspondingly, the terminal device receives the DCI from the network device.

Figures 1, 8:
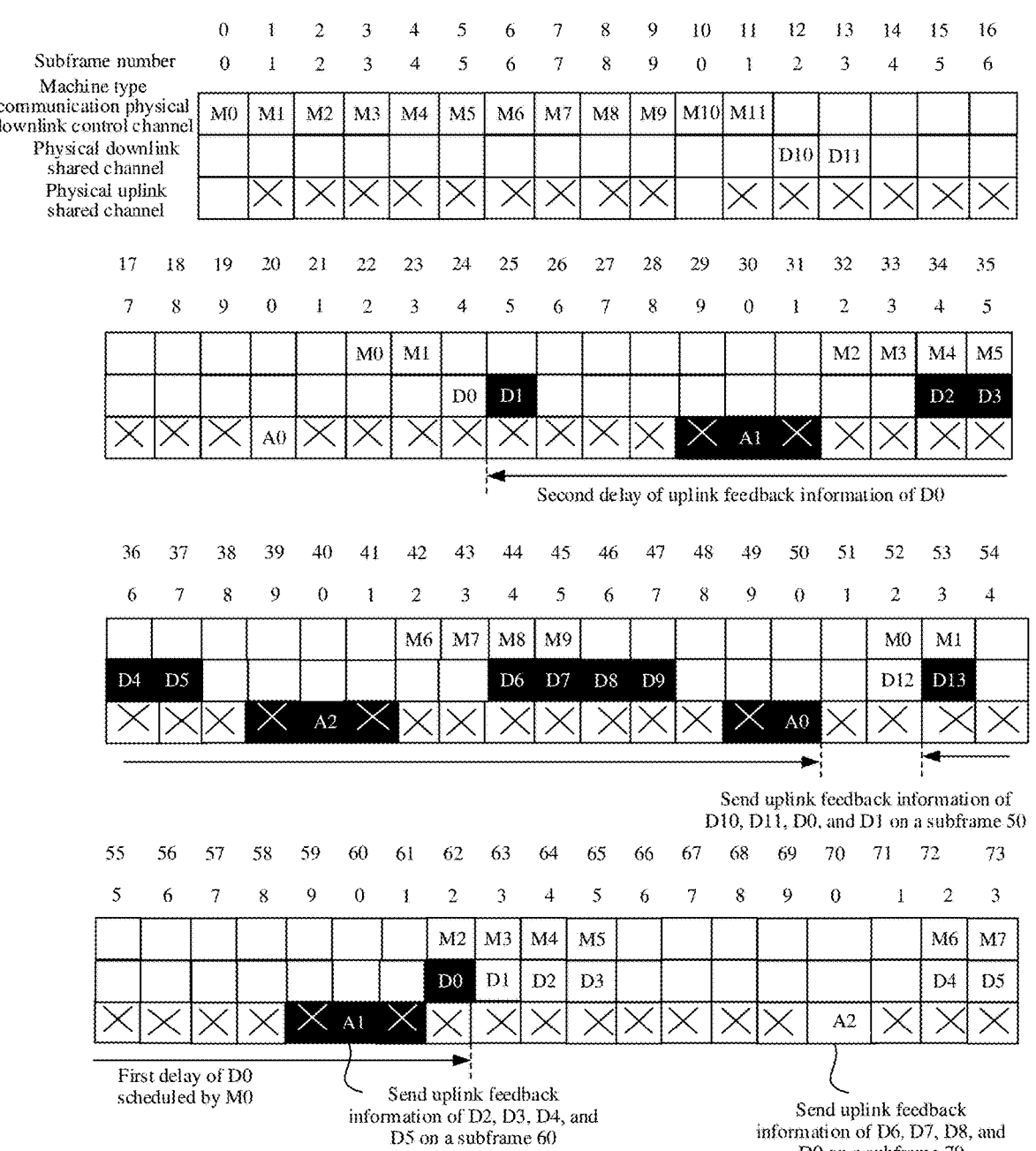
Figures 2, 8:
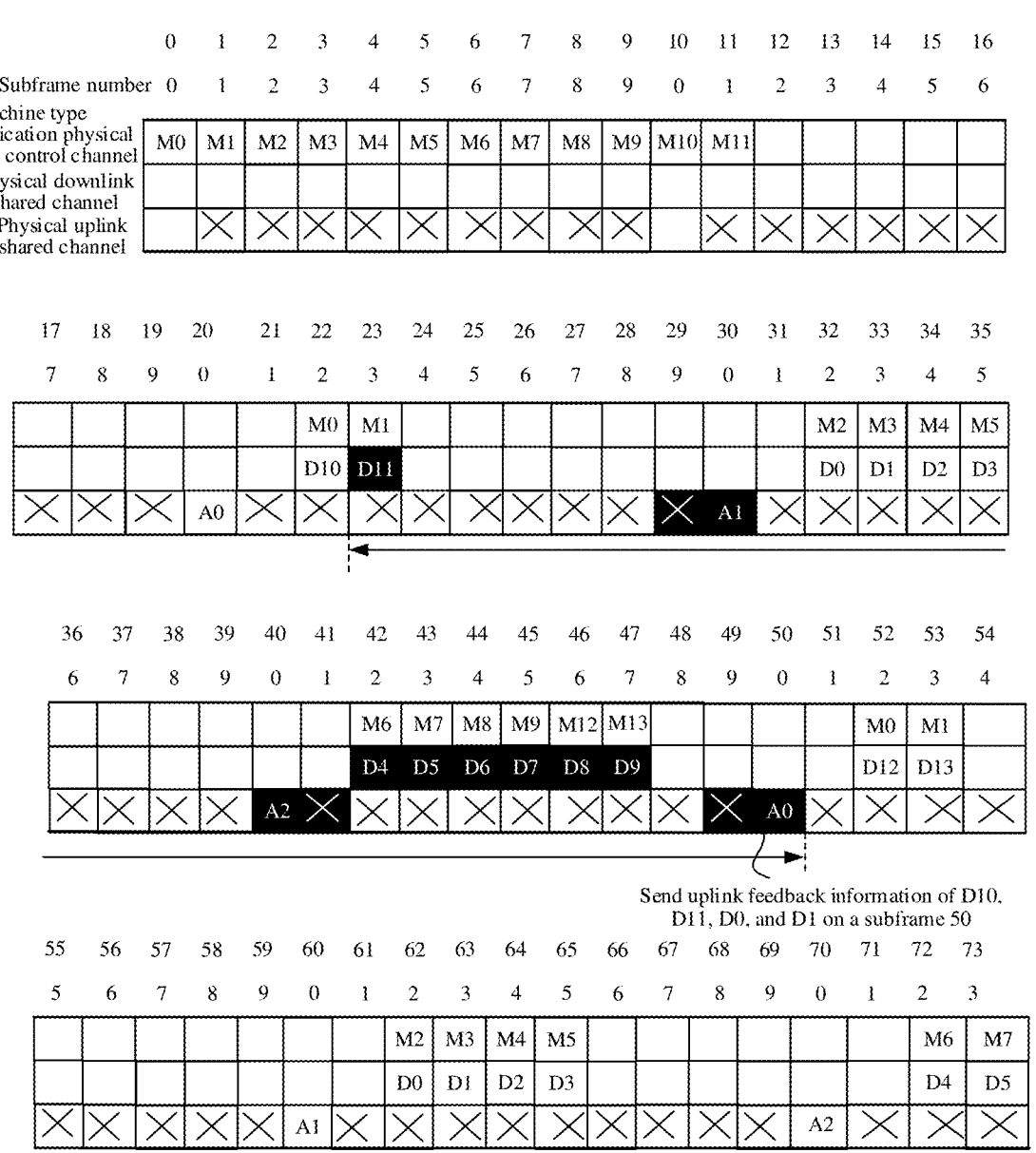

The DCI is carried on a PDCCH. The DCI indicates a first delay. The first delay is a delay of a PDSCH scheduled by the PDCCH, namely, a PDSCH scheduling delay. That the PDCCH includes the DCI may be understood as that the DCI may be carried on the PDCCH. For example, a first delay between M0 and D0 scheduled by M0 is shown in FIG. 8-1.

The first delay includes five or six subframes, and the first delay includes a subframe type 1 or a subframe type 2. The subframe type 1 includes the following subframes in sequence: one downlink BL/CE subframe, one first subframe, X uplink BL/CE subframes, one second subframe, and one first downlink BL/CE subframe, and the first downlink BL/CE subframe is used to receive a PDSCH scheduled by the PDCCH; and/or the subframe type 2 includes the following subframes in sequence: one first subframe, X uplink BL/CE subframes, one second subframe, one first downlink BL/CE subframe, and one second downlink BL/CE subframe, and the second downlink BL/CE subframe is used to receive the PDSCH scheduled by the PDCCH. X is 1 or 2.

That is, compared with that a PDSCH scheduling delay is seven subframes (where X corresponding to the PDSCH scheduling delay is 3) in the technology of some approaches, in embodiments of this application, the first delay (namely, the PDSCH scheduling delay) may alternatively be five subframes or six subframes. In addition, when the first delay is five subframes, the first delay may have two subframe types, namely, the subframe type 1 and the subframe type 2, and X corresponding to the first delay is 1. Similarly, when the first delay is six subframes, the first delay may have the subframe type 1 and the subframe type 2, and X corresponding to the first delay is 2.

The foregoing first subframe and the foregoing second subframe may be subframes of any type, may be BL/CE subframes, or may be non-BL/CE subframes. The first subframe and the second subframe may be used as guard intervals between subframes. Similarly, for functions of a seventh subframe to a fifth subframe mentioned later, refer to the first subframe and the second subframe. Specific types of the first subframe to the fifth subframe are not limited in this embodiment of this application.

Specific structures of the foregoing subframe type 1 and subframe type 2 are described below by using examples. The subframe type 1 is first described by using an example. Refer to FIG. 8-1. When X=1, a first delay of D0 scheduled by M0 of a subframe 52 is of the subframe type 1. The subframe type 1 includes subframes indicated by black blocks in sequence: one downlink BL/CE subframe (a subframe 53), one first subframe (a subframe 59), one uplink BL/CE subframe (a subframe 60), one second subframe (a subframe 61), and one first downlink BL/CE subframe (a subframe 62). The subframe 62 is used by the terminal device to receive D0 scheduled by M0.

It should be noted that ACK or NACK may be carried by using a PUCCH or a PUSCH. In this embodiment of this application, an example in which ACK/NACK is carried by using the PUSCH is used for description.

Next, a structure of the subframe type 1 when X=2 is described by using an example. For example, in some other cases, after sending M10 and M11, the network device may send D10 and D11 after two uplink BL/CE subframes used to feed back uplink feedback information. That is, D10 and D11 shown in FIG. 8-2 are sent after a subframe 30 and before a subframe 40. In this case, the first delay of D10 scheduled by M10 includes: one downlink BL/CE subframe (namely, a downlink BL/CE subframe in which D11 is located), one first subframe (for example, a subframe 29), two uplink BL/CE subframes (the subframe 30 and the subframe 40), one second subframe (for example, a subframe 41), and one first downlink BL/CE subframe (for example, a subframe 42). The subframe 42 is used by the terminal device to receive D10 scheduled by the M10.

Still refer to FIG. 8-1. It can be seen that, due to the factor that a non-BL/CE frame exists or other factors, a quantity of subframes (namely, 10 subframes from a subframe 53 to a subframe 62) constituting the first delay shown in the figure may be greater than a quantity of subframes (five) indicated by black blocks. In some other cases, for example, when there is no uplink non-BL/CE subframe, the quantity of subframes constituting the first delay may alternatively be equal to the quantity of subframes indicated by the black blocks.

In addition, in this embodiment of this application, "the first delay includes the following subframes in sequence"

means that the following subframes are not adjacent to each other. Some subframes in the following subframes may be adjacent to each other, or may be separated from each other. Still refer to FIG. 8-1. The first delay includes subframes indicated by black blocks in sequence. In the subframes indicated by the black blocks, a subframe 53 is not adjacent to a subframe 59, and the subframe 59 is adjacent to a subframe 60.

In addition, in this embodiment of this application, "the first delay includes the following subframes" does not exclude that the first delay further includes a subframe other than "the following subframes". Still refer to FIG. 8-1. The first delay of D0 scheduled by M0 includes a subframe indicated by a black block, and may further include a subframe 54 to a subframe 58.

The following describes the subframe type 2 by using an example. A structure of the subframe type 2 when X=1 is first described. For example, still refer to FIG. 8-1. When X=1, the first delay of D1 scheduled by M1 in subframe 53 is of the subframe type 2, and the subframe type 2 includes the following subframes in sequence: one first subframe (a subframe 59), one uplink BL/CE subframe (a subframe 60), one second subframe (a subframe 61), one first downlink BL/CE subframe (a subframe 62), and one second downlink BL/CE (a subframe 63). The subframe 62 is used by the terminal device to receive D0 scheduled by M0, and the subframe 63 is used by the terminal device to receive D1 scheduled by M1.

Next, a structure of the subframe type 2 when X=2 is described by using an example. For example, in some other cases, after sending M10 and M11, the network device may send D10 and D11 after two uplink BL/CE subframes used to feed back uplink feedback information. That is, D10 and D11 shown in FIG. 8-2 are sent after a subframe 30 and before a subframe 40. In this case, the first delay of D11 scheduled by M11 includes: one first subframe (for example, a subframe 29), two uplink BL/CE subframes (the subframe 30 and the subframe 40), one second subframe (for example, a subframe 41), one first downlink BL/CE subframe (for example, a subframe 42), and one second downlink BL/CE subframe 43. The subframe 42 is used by the terminal device to receive D10 scheduled by M10. The subframe 43 is used by the terminal device to receive D11 scheduled by M11.

It can be learned that, in the solution shown in FIG. 4-3, the base station schedules the subframe D10 for downlink transmission (where downlink data is sent on a subframe 32) only after feedback of a subframe A0, a subframe A1, and a subframe A2 is completed, and a PDSCH scheduling delay is relatively long. Compared with the foregoing solution, in this embodiment of this application, when X is less than 3, the base station may send the subframe D10 within the following three time periods in which idle downlink BL/CE subframes may be included: before scheduling of the subframe A0, or after scheduling of the subframe A0 and before scheduling of the subframe A1, or after scheduling of the subframe A1 and before scheduling of the subframe A2, and a PDSCH scheduling delay is relatively short, so that the terminal can receive downlink data in time. In other words, the idle downlink BL/CE subframes may be scheduled by the base station eNB to send a PDSCH. In addition, in the technical solution shown in FIG. 4-3, none of the downlink subframes 2 to 31 is fully utilized. In the technical solution in this embodiment of this application, these idle subframes can be fully utilized, that is, resource utilization is improved.

In a possible implementation, the DCI indicates that the first delay includes five or six subframes, and indicates a subframe type of the first delay. The subframe type includes the foregoing subframe type 1 and the foregoing subframe type 2.

In some embodiments a field may be added to the DCI to indicate the first delay. Alternatively, an existing field in the DCI is reused to indicate the first delay.

When the existing field in the DCI is reused to indicate the first delay, in some embodiments a repetition number field and/or another field in the DCI may be reused to indicate the PDSCH scheduling delay, that is, indicate the first delay. For example, two bits included in the reused repetition number field and three bits included in a HARQ-ACK delay field jointly indicate a PDSCH scheduling first delay, and indicate a corresponding HARQ-ACK delay value. Certainly, another existing field in the DCI may alternatively be reused to indicate the first delay. A type of a field in the reused DCI, a quantity of bits in the field, and specific content indicated by each bit are not limited in this embodiment of this application.

For example, Table 3 shows an example in which a repetition number field and a HARQ-ACK delay field indicate the first delay.

TABLE 3

| DCI | | | |
|---|---|---|---|
| Repetition number field | HARQ-ACK delay field | HARQ-ACK delay | First delay |
| 00 | 000 | 4 | Legacy (legacy) |
| | 001 | 5 | |
| | 010 | 6 | |
| | 011 | 7 | |
| | 100 | 8 | |
| | 101 | 9 | |
| | 110 | 10 | |
| | 111 | 11 | |
| 01 | 000 | . . . | 5 (a subframe type 1, where X = 1) |
| | 001 | . . . | . . . |
| | 010 | . . . | 5 (a subframe type 2, where X = 1) |
| | 011 | . . . | . . . |
| | 100 | . . . | 6 (a subframe type 1, where X = 2) |
| | 101 | . . . | . . . |
| | 110 | . . . | 6 (a subframe type 2, where X = 2) |
| | 111 | . . . | 7 (a subframe type 1, where X = 3) |
| 10 | 000 | . . . | . . . |
| | 001 | . . . | 7 (a subframe type 2, where X = 3) |
| | | Reserved (reserved) | |

For example, as shown in Table 3, that bits in the repetition number field in the DCI are 01, and bits in the HARQ-ACK delay field are 000 is used as an example. The DCI indicates that the first delay is five subframes (X=1). In addition, a subframe type corresponding to the first delay is the subframe type 1, that is, the first delay includes the following subframes in sequence: one downlink BL/CE subframe, one first subframe, one uplink BL/CE subframe, one second subframe, and one first downlink BL/CE subframe, where the first downlink BL/CE subframe is used to receive a PDSCH scheduled by a PDCCH.

A value at " . . . " in Table 3 may be set according to an actual application requirement.

Table 3 provides only an example in which the first delay and the HARQ-ACK delay are indicated by using three bits of the HARQ-ACK delay field and two bits of the repetition number field, and there may be another indication manner. For example, content specifically indicated by the bits used to indicate the first delay may be flexibly set. For another example, a specific quantity of used bits may be set separately. Reserved fields can also be set separately as required.

It should be noted that a BL/CE subframe is introduced for BL/CE UE. For UE of another similar type, there may be a subframe of another corresponding type, that is, the BL/CE subframe may be replaced with a valid subframe for information transmission corresponding to the UE of another type.

In some other embodiments, the DCI indicates that the first delay includes five or six subframes. The terminal device determines, based on the DCI, that a quantity of subframes included in the first delay is 5 or 6, and determines a subframe type of the first delay according to a set rule. The set rule may be a rule predefined by a protocol, and is configured in the terminal device before delivery. Certainly, the rule set in this embodiment of this application is not limited thereto. For example, the DCI indicates to the terminal device that the first delay is five subframes, and the terminal device determines, according to a configured rule, that the first delay is of the subframe type 1, and receives, based on the first delay, downlink data scheduled by the PDCCH.

S102: The terminal device determines the first delay based on downlink control information.

Correspondingly, for the terminal device, after receiving the DCI from the network device on the subframe 1, the terminal device decodes the DCI. It is assumed that it is learned that two bits of the repetition number field are 01, and three bits of the HARQ-ACK delay field are 011. The terminal device may learn, based on a configuration such as Table 3, that the first delay is the first delay of the subframe type 1, and a value of X is 1. It can be learned that the first delay includes one downlink BL/CE subframe, one first subframe, one uplink BL/CE subframe, one second subframe, and one downlink BL/CE subframe in sequence. In this case, the terminal device receives, based on the first delay indicated by the DCI, the PDSCH scheduled by the PDCCH. For example, as shown in FIG. 8-1, in a possible implementation, after receiving and decoding the DCI in the subframe M0, the terminal device determines the first delay based on the DCI, that is, the first delay includes the following subframes in sequence: the 1$^{st}$ downlink BL/CE subframe (a subframe 53) after a subframe 52, and the 1$^{st}$ first subframe (a subframe 59) after the 1$^{st}$ downlink BL/CE subframe, the 1$^{st}$ uplink BL/CE subframe (a subframe 60) after the first subframe, the 1$^{st}$ second subframe (a subframe 61) after the 14 uplink BL/CE subframe, and the 14 downlink BL/CE subframe (a subframe 62) after the second subframe.

S103: The network device sends downlink data to the terminal device on the PDSCH based on the first delay.

For example, still refer to FIG. 8-1. It is assumed that the network device sends DCI to the terminal device on the subframe 59. Two bits in the repetition number field included in the DCI are 01, and three bits in the HARQ-ACK delay field are 011. It can be learned from Table 3 that the first delay is five subframes, the first delay corresponds to the subframe type 1, and the value of X is 1. In this case, for the network device, the network device sends, to the terminal device on the subframe 62 based on the first delay, downlink data on D0 scheduled by M0.

It should be noted that, in this embodiment of this application, a sequence of the steps is not limited. For example, S102 may be performed before S103, or S102 may be performed after S103, or S102 and S103 may be performed simultaneously.

S104: The terminal device receives the downlink data on the physical downlink shared channel based on the first delay.

It may be understood that when the terminal device learns of the first delay, namely, the PDSCH scheduling delay, the terminal device may receive, based on the first delay, the downlink data in the time unit scheduled by the network device. For example, still refer to FIG. 8-1. The terminal device determines the first delay, and receives, on the 1$^{st}$ downlink BL/CE subframe (the subframe 62) after the second subframe included in the first delay, the downlink data scheduled by the subframe 52.

In embodiments of this application, the network device may indicate, by using the DCI, the time unit for receiving the downlink data by the terminal device. The network device sets a subframe type of a scheduled subframe, so that an idle valid subframe can be used as much as possible. Therefore, a peak rate at which the terminal device receives data can be improved as much as possible.

In addition, in the technology of some approaches, the base station may send downlink data only after A0, A1, and A2 are scheduled to complete feedback of uplink feedback information for three times. Compared with the technology of some approaches, in the communication method provided in this embodiment of this application, the network device may indicate a time unit on which the terminal device receives the downlink data. X may be less than 3. This means that the network device may send downlink data without needing to schedule A0, A1, and A2 to complete feedback of uplink feedback information for three times, and may send the downlink data by using a subframe that can perform effective downlink data transmission. In this way, resource utilization can be improved as much as possible. In this way, a data rate of the terminal device is improved.

Figure 9:
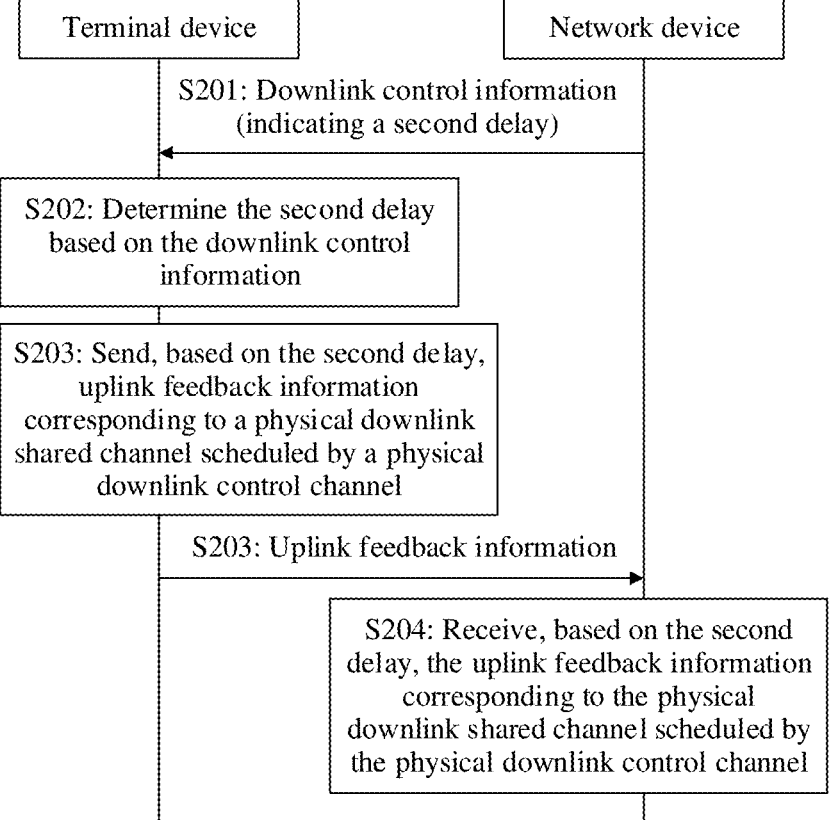
FIG. 9 is a schematic flowchart 2 of a communication method according to an embodiment of this application.

Some other embodiments of this application further provide a communication method. Refer to FIG. 9. The method includes the following steps.

S201: A network device sends DCI to a terminal device. Correspondingly, the terminal device receives the DCI from the network device. The DCI indicates a second delay. The second delay is a delay of uplink feedback information of a PDSCH scheduled by a PDCCH, namely, a HARQ-ACK delay. The second delay includes Y subframes.

In some embodiments a bit of an existing field in the DCI is reused to indicate the second delay, or a bit is added to the DCI to indicate the second delay.

In this embodiment of this application, the second delay may have different subframe types. The details are described as follows.

Case 1: When a PDSCH scheduling delay is two downlink BL/CE subframes, the second delay includes the following subframes in sequence: Y4 downlink BL/CE subframes, one seventh subframe, one uplink BL/CE subframe, one eighth subframe, Y1 downlink BL/CE subframes, one third subframe, one uplink BL/CE subframe, one ninth subframe, Y3 downlink BL/CE subframes, one sixth subframe, one uplink BL/CE subframe, one fourth subframe, Y2 downlink BL/CE subframes, one fifth subframe, and Z uplink BL/CE subframes.

Y4, Y1, Y3, Y2, and Y are non-negative integers, and Y is 21 or 22. Z is 1, 2, or 3.

In some embodiments Y4, Y1, Y3, and Y2 meet: Y4+Y1+Y3+Y2=Y−10−Z.

For example, refer to FIG. 8-1. A PDSCH scheduling delay of D10 scheduled by M10 is two downlink BL/CE subframes, and the terminal device receives the DCI on a subframe 10. The DCI is used to schedule downlink data corresponding to a process 10. The DCI indicates a value of the second delay, that is, Y=22, and may further indicate that the second delay includes the following subframes in sequence: Y4 downlink BL/CE subframes, one seventh subframe, one uplink BL/CE subframe, one eighth subframe, Y1=4 downlink BL/CE subframes, one third subframe, one uplink BL/CE subframe, one ninth subframe, Y3=4 downlink BL/CE subframes, one sixth subframe, one uplink BL/CE subframe, one fourth subframe, Y2=2 downlink BL/CE subframes, one fifth subframe, and Z=1 uplink BL/CE subframe. In addition, the terminal device may learn that the downlink data corresponding to the process 10 needs to be received on a subframe 12. In this case, the terminal device sequentially determines the following subframes: Y4=1 downlink BL/CE subframe after the subframe 12 and before the $1^{st}$ uplink BL/CE subframe after the subframe 12 (namely, a subframe 13 after the subframe 12 and before a subframe 20 in FIG. 8-1), the $1^{st}$ seventh subframe (a subframe 19) after a subframe 13, the $1^{st}$ uplink BL/CE subframe (a subframe 20) after the subframe 13, the $1^{st}$ eighth subframe (namely, a subframe 21) after the $1^{st}$ uplink BL/CE subframe, Y1=2 downlink BL/CE subframes (a subframe 24 and a subframe 25) after the $1^{st}$ eighth subframe and before the $2^{nd}$ uplink BL/CE subframe, one third subframe (a subframe 29), the $2^{nd}$ uplink BL/CE subframe (a subframe 30), one ninth subframe (a subframe 31), Y3=4 downlink BL/CE subframes (a subframe 34 to a subframe 37) after the $2^{nd}$ uplink BL/CE subframe and before the $3^{rd}$ uplink BL/CE subframe, one sixth subframe (a subframe 39), the $3^{rd}$ uplink BL/CE subframe (a subframe 40), one fourth subframe (a subframe 41), Y2=4 downlink BL/CE subframes (a subframe 44 to a subframe 47), one fifth subframe (a subframe 49), and Z=1 uplink BL/CE subframe (a subframe 50). In addition, the terminal device sends, on the subframe 50, ACK/NACK for the subframe D10.

Alternatively, when the PDSCH scheduling delay is two downlink BL/CE subframes, the second delay includes the following subframes in sequence: Y4 downlink BL/CE subframes, one seventh subframe, three uplink BL/CE subframes, one fourth subframe, Y2 downlink BL/CE subframes, one fifth subframe, and Z uplink BL/CE subframes. Y4, Y2, and Y are all non-negative integers, Y is greater than or equal to 11, and Y is less than or equal to 18. Z is 1, 2, or 3.

For example, still refer to FIG. 8-1. A PDSCH scheduling delay of D0 scheduled by M0 in a subframe 22 is two downlink BL/CE subframes. The second delay of the uplink feedback information of D0 scheduled by M0 may include the following subframes in sequence: Y4=1 downlink BL/CE subframe (namely, a subframe 13), one seventh subframe (a subframe 29), three uplink BL/CE subframes (a subframe 20, a subframe 30, and a subframe 40), one fourth subframe (a subframe 41), Y2=4 downlink BL/CE subframes (a subframe 44 to a subframe 47), one fifth subframe (a subframe 49), and Z=1 uplink BL/CE subframe (a subframe 50). The terminal device sends ACK/NACK of D0 on the subframe 50 based on the second delay indicated by the DCI.

Case 2: When a PDSCH scheduling delay is five subframes (where X=1), the second delay includes the following subframes in sequence: Y1 downlink BL/CE subframes, one third subframe, one uplink BL/CE subframe, one ninth subframe, Y3 downlink BL/CE subframes, one sixth subframe, one uplink BL/CE subframe, one fourth subframe, Y2 downlink BL/CE subframes, one fifth subframe, and Z uplink BL/CE subframes. Y1, Y3, Y2, and Y are non-negative integers. Y is greater than or equal to 16, and Y is less than or equal to 19. Z is 1, 2, or 3. In some embodiments Y1, Y3, and Y2 meet: Y1+Y3+Y2=Y−7−Z.

For example, still refer to FIG. 8-1. A PDSCH scheduling delay for scheduling D10 by M10 in a subframe 10 is five subframes (X=1), the network device indicates the second delay to the terminal device by using DCI, and a value of the second delay is 19. The second delay includes the following subframes in sequence: Y1=1 downlink BL/CE subframe (a subframe 23), one third subframe (a subframe 29), one uplink BL/CE subframe (a subframe 30), one ninth subframe (a subframe 31), Y3=4 downlink BL/CE subframes (a subframe 32 to a subframe 35), one sixth subframe (a subframe 39), one uplink BL/CE subframe (a subframe 40), one fourth subframe (a subframe 41), Y2=6 downlink BL/CE subframes (a subframe 42 to a subframe 47), one fifth subframe (a subframe 49), and Z=1 uplink BL/CE subframe (a subframe 50). The terminal device sends ACK/NACK on the subframe 50 based on the second delay indicated by the DCI.

It should be noted that a plurality of consecutive PDSCHs may correspond to one time unit used to feed back uplink feedback information, or a plurality of interleaved PDSCHs may correspond to one time unit used to feed back uplink feedback information. Interleaving means discontinuous, and may be a time interval between PDSCHs. For example, an uplink BL/CE subframe is used to feed back uplink feedback information of four consecutive PDSCHs D10, D11, D0, and D1. For another example, a subframe is used to feed back uplink feedback information of four interleaved PDSCHs D10, D1, D4, and D7.

Alternatively, when the PDSCH scheduling delay is five subframes (where X=1), the second delay includes the following subframes in sequence: Y1 downlink BL/CE subframes, one third subframe, two uplink BL/CE subframes, one fourth subframe, Y2 downlink BL/CE subframes, one fifth subframe, and Z uplink BL/CE subframes. Y1, Y2, and Y are non-negative integers. Y is greater than or equal to 10, and Y is less than or equal to 17. Z is 1, 2, or 3.

For example, FIG. 8-2 shows an example of the second delay indicated by the DCI. A value of the second delay is 13, and the second delay includes Y1=1 downlink BL/CE subframe, one third subframe, two uplink BL/CE subframes, one fourth subframe, Y2=6 downlink BL/CE subframes, one fifth subframe, and Z=1 uplink BL/CE subframe in sequence. The terminal device sends the ACK/NACK for D10 on a subframe 50 based on the second delay indicated by the DCI.

Case 3: When a PDSCH scheduling delay is six subframes (where X=2), the second delay includes the following subframes in sequence: Y3 downlink BL/CE subframes, one sixth subframe, one uplink BL/CE subframe, one fourth subframe, Y2 downlink BL/CE subframes, one fifth subframe, and Z uplink BL/CE subframes.

Y3, Y2, and Y are non-negative integers. Y is greater than or equal to 10, and Y is less than or equal to 16. Z is 1, 2, or 3. In some embodiments Y3 and Y2 meet: Y3+Y2=Y−4−Z.

Case 4: When a PDSCH scheduling delay is seven subframes (where X=3), the second delay includes the following subframes in sequence: Y−Z−1 downlink BL/CE subframes, one tenth subframe, and Z uplink BL/CE subframes.

Y is an integer. Y is greater than or equal to 4, and Y is less than or equal to 13. Z is 1, 2, or 3.

It may be understood that, in some other cases, after sending M10 and M11, the network device may send D10 and D11 after three uplink BL/CE subframes used to feed back uplink feedback information. That is, D10 and D11 shown in FIG. 8-2 are sent after a subframe 40 and before a subframe 50. In this case, Z=1 and Y=13 are used as an example. The first delay of D10 scheduled by M10 includes: Y-Z-1=11 downlink BL/CE subframes (for example, 11 downlink BL/CE subframes in which D11 and D0 to D9 are located), one tenth subframe (for example, a subframe 49), and Z=1 uplink BL/CE subframe (a subframe 50). The subframe 50 is used by the terminal device to receive D10 scheduled by the M10.

As mentioned above, bits in the DCI may be reused to indicate the second delay. Table 4 shows an example in which the HARQ-ACK delay field and the repetition number field in the DCI are reused to indicate the second delay.

TABLE 4

| Repetition number field | HARQ-ACK delay field | Second delay | First delay |
|---|---|---|---|
| 00 | 000 | 4 | Legacy (legacy) |
| | 001 | 5 | |
| | 010 | 6 | |
| | 011 | 7 | |
| | 100 | 8 | |
| | 101 | 9 | |
| | 110 | 10 | |
| | 111 | 11 | |
| 01 | 000 | 12 (Z = 1, Y4 = 1, and Y2 = 4) | Two downlink BL/CE subframes |
| | 001 | 11 (Z = 1, Y4 = 0, and Y2 = 4) | Two downlink BL/CE subframes |
| | 010 | 11 (X = 1, Z = 1, Y1 = 1 and Y2 = 4) | Five subframes |
| | 011 | 10 (X = 1, Z = 1, Y1 = 0, and Y2 = 4) | Five subframes |
| | 100 | 13 (X = 2, Y3 = 3, Y2 = 4, and Z = 2) | Six subframes |
| | 101 | 12 (X = 2, Y3 = 2, Y2 = 4, and Z = 2) | Six subframes |
| | 110 | 11 (X = 2, Y3 = 1, Y2 = 4, and Z = 2) | Six subframes |
| | 111 | 10 (X = 2, Y3 = 0, Y2 = 4, and Z = 2) | Six subframes |
| 10 | 000 | 7 (X = 3, and Z = 3) | Seven subframes |
| | 001 | 6 (X = 3, and Z = 3) | Seven subframes |
| | 010 | 5 (X = 3, and Z = 3) | Seven subframes |
| | 011 | 4 (X = 3, and Z = 3) | Seven subframes |
| | | Reserved (reserved) | |

For example, as shown in Table 4, that a bit in the repetition number field in the DCI is 01, and a bit in the HARQ-ACK delay field is 100 is used as an example. The DCI indicates that the second delay is 13 subframes when the PDSCH scheduling delay is six subframes (where X=2). Specifically, the second delay includes the following subframes in sequence: Y3=3 downlink BL/CE subframes, one sixth subframe, one uplink BL/CE subframe, one fourth subframe, Y2=4 downlink BL/CE subframes, one fifth subframe frame, and Z=2 uplink BL/CE subframes.

Twelve bold lines in Table 4 are delays corresponding to D10, D11, and D0 to D9 shown in FIG. 8-1.

Table 4 provides only an example in which the second delay is indicated by using three bits of the HARQ-ACK delay field and two bits of the repetition number field. There may also be another indication manner. For example, content specifically indicated by the bit used to indicate the second delay may be flexibly set. For another example, a specific quantity of used bits may be set separately. Reserved fields can also be set separately as required.

Certainly, a table specifically used to indicate the second delay may be another table, and is not limited to that shown in Table 4.

S202: The terminal device determines the second delay based on the DCI.

S203: The terminal device sends, based on the second delay, the uplink feedback information corresponding to the PDSCH scheduled by the PDCCH.

Correspondingly, the network device receives, from the terminal device based on the second delay, the uplink feedback information corresponding to the PDSCH.

The uplink feedback information includes ACK or NACK.

In a possible implementation, the network device sends, on the last uplink BL/CE subframe of the Z uplink BL/CE subframes based on the second delay, ACK/NACK corresponding to the PDSCH.

For example, still refer to FIG. 8-1. The network device sends a PDCCH to the terminal device on a subframe 22 (corresponding to M0). The PDCCH carries the DCI, the DCI indicates the second delay shown in FIG. 8-1, and the second delay includes Y4 downlink BL/CE subframes, one seventh subframe, one uplink BL/CE subframe, one eighth subframe, Y1 downlink BL/CE subframes, one third subframe, one uplink BL/CE subframe, one ninth subframe, Y3 downlink BL/CE subframes, one sixth subframe, one uplink BL/CE subframe, one fourth subframe, Y2 downlink BL/CE subframes, one fifth subframe, and Z uplink BL/CE subframes in sequence. In this way, after decoding the DCI, the terminal device sends the ACK or the NACK to the network device on the subframe 50 based on a combination of subframes that are indicated by black blocks and that are included in the second delay.

S204: The network device receives, based on the second delay, the uplink feedback information corresponding to the PDSCH scheduled by the PDCCH.

It can be learned that in the embodiment corresponding to FIG. 9, the network device may indicate, by using the DCI, a time unit in which the terminal device sends the uplink feedback information.

It should be noted that the embodiment corresponding to FIG. 7 and the embodiment corresponding to FIG. 9 may be separately implemented or jointly implemented.

For example, in some cases, the network device may indicate the first delay (namely, the PDSCH scheduling delay) according to the embodiment corresponding to FIG. 7, and indicate the HARQ-ACK delay according to the solution in the technology of some approaches.

For another example, in some cases, there is a bundle (bundle) relationship between the first delay (namely, the PDSCH scheduling delay) and the second delay (namely, the HARQ-ACK delay), and the network device may indicate both the first delay and the second delay associated with the first delay. For example, when the first delay is five, six, or seven subframes or two downlink BL/CE subframes, one or more associated second delays are indicated. For example, when the first delay is two downlink BL/CE subframes, the network device may indicate one or more second delays associated with the first delay to the terminal device.

For another example, in some cases, the network device indicates the second delay (namely, the HARQ-ACK delay) according to the embodiment corresponding to FIG. 9, and indicates the PDSCH scheduling delay according to the solution in the technology of some approaches.

For another example, in some cases, the second delay in Case 4 is applicable to a case in which X=3, that is, when X=3, the network device may indicate the second delay corresponding to case 4 to the terminal device.

Figure 10:
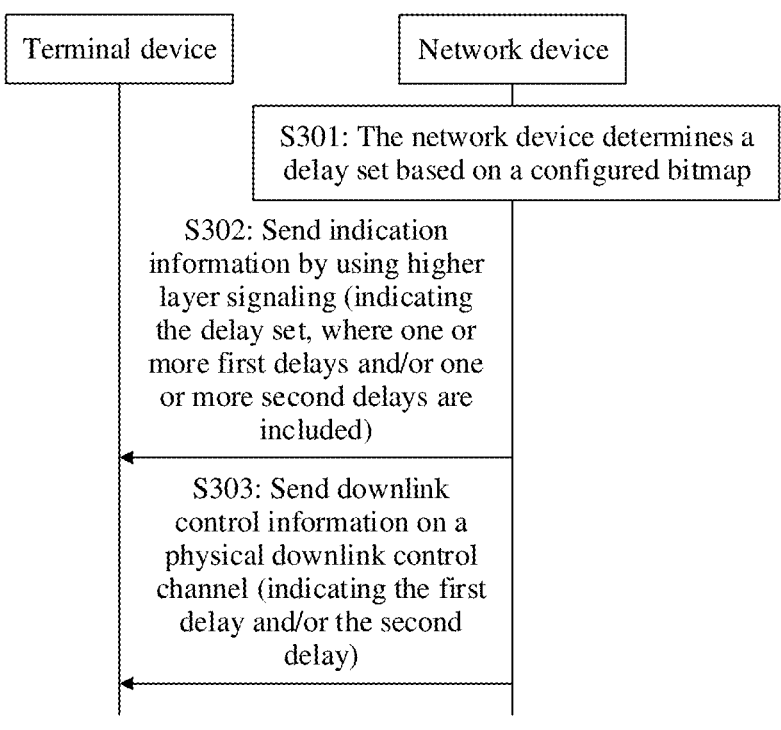
FIG. 10 is a schematic flowchart 3 of a communication method according to an embodiment of this application.

Some other embodiments of this application further provide a communication method. As shown in FIG. 10, the method includes the following steps.

S301: A network device determines a delay set based on a configured bitmap.

The delay set includes a first delay and/or a second delay. In other words, the delay set indicates the first delay and/or the second delay. To be specific, the delay set includes one or more first delays (namely, PDSCH scheduling delays), or the delay set includes one or more second delays (namely, HARQ-ACK delays), or the delay set includes one or more first delays and one or more second delays. The first delay is a delay of a PDSCH scheduled by a PDCCH. The second delay is a delay of uplink feedback information of the PDSCH scheduled by the PDCCH.

It should be noted that the first delay in the delay set may have different subframe types. Specifically, the first delay includes five, six, or seven subframes; the first delay includes a subframe type 1 or a subframe type 2; and the subframe type 1 includes the following subframes in sequence: one downlink bandwidth reduced low complexity-coverage enhancement BL/CE subframe, one first subframe, X uplink BL/CE subframes, one second subframe, and one first downlink BL/CE subframe, and the first downlink BL/CE subframe is used to receive the physical downlink shared channel scheduled by the physical downlink control channel; or the subframe type 2 of the first delay includes the following subframes in sequence: one first subframe, X uplink BL/CE subframes, one second subframe, one first downlink BL/CE subframe, and one second downlink BL/CE subframe, and the second downlink BL/CE subframe is used to receive the physical downlink shared channel scheduled by the physical downlink control channel, where X is 1, 2, or 3. For example, it may be indicated that the first delay includes subframes indicated by the black block in FIG. 8-1 in sequence.

Alternatively, the first delay in the delay set is a downlink BL/CE subframe included in the first delay. In a possible implementation, the first delay includes M consecutive downlink BL/CE subframes, where M is an integer greater than or equal to 2. For example, the first delay includes downlink BL/CE subframes indicated by black blocks in FIG. 3-1.

Alternatively, the first delay in the delay set may be another time unit. This is not limited in this embodiment of this application.

Similarly, the second delay in the delay set may have different subframe types. In a possible implementation, the second delay includes Y subframes.

When X=1, the second delay includes the following subframes in sequence: Y1 downlink BL/CE subframes, one third subframe, one uplink BL/CE subframe, one ninth subframe, Y3 downlink BL/CE subframes, one sixth subframe, one uplink BL/CE subframe, one fourth subframe, Y2 downlink BL/CE subframes, one fifth subframe, and Z uplink BL/CE subframes. Y1, Y3, Y2, Y, and Z are non-negative integers. Y is greater than or equal to 16, and Y is less than or equal to 19. Z is 1, 2, or 3. In some embodiments Y1, Y3, and Y2 meet: Y1+Y3+Y2=Y−7−Z.

Alternatively, when X=1, the second delay includes the following subframes in sequence: Y1 downlink BL/CE subframes, one third subframe, two uplink BL/CE subframes, one fourth subframe, Y2 downlink BL/CE subframes, one fifth subframe, and Z uplink BL/CE subframes, where Y1, Y2, Y, and Z are non-negative integers; Y is greater than or equal to 10, and Y is less than or equal to 17; and Z is 1, 2, or 3; and/or when X=2, the second delay includes the following subframes in sequence: Y3 downlink BL/CE subframes, one sixth subframe, one uplink BL/CE subframe, the one fourth subframe, the Y2 downlink BL/CE subframes, the one fifth subframe, and the Z uplink BL/CE subframes, where Y3, Y2, and Y are non-negative integers; Y is greater than or equal to 10, and Y is less than or equal to 16; and Z is 1, 2, or 3.

In some other embodiments, the second delay in the delay set may also be consecutive subframes included in the second delay. That is, the second delay includes Y consecutive subframes, and Y is an integer greater than or equal to 4.

Alternatively, the second delay in the delay set may be another time unit. This is not limited in this embodiment of this application.

It should be further noted that when the delay set includes a plurality of first delays, values (values) of the plurality of first delays are different. For example, the delay set includes two first delays, and values of the two first delays are respectively six subframes and seven subframes. The six subframes and seven subframes may be downlink BL/CE subframes included in the first delay. Certainly, the first delay may alternatively be another quantity of downlink BL/CE subframes, or correspond to different subframe types.

As described above, a bit of the bitmap may indicate whether a corresponding subframe is a BL/CE subframe. In this embodiment of this application, the network device may determine the delay set based on the bitmap. For example, the first delay in the delay set is determined. When the network device configures a first uplink bitmap and downlink bitmap for the terminal device, the network device calculates that D10 scheduled by M10 may be located on a subframe 9. The first delay corresponding to D10 is six downlink BL/CE subframes. In this way, D10 can be sent in a short time period after a subframe 7 used to feed back uplink feedback information, and the idle subframe 9 can be fully utilized, to help increase a peak rate of the terminal device. When the network device configures a second uplink bitmap and downlink bitmap for the terminal device, the network device calculates that D10 scheduled by M10 may be located on a subframe 10. The first delay corresponding to D10 is seven downlink BL/CE subframes. In this case, D10 can also be sent in a short time period after a subframe 7. It can be learned that, in different bitmap configurations, first delays indicated by the network device to the terminal device may be different, to help improve resource utilization in a corresponding bitmap configuration as much as possible. Similarly, in cases of different bitmap configurations, the network device may indicate different second delays to the terminal device, to help improve resource utilization in cases of corresponding bitmap configurations.

Figure 11:
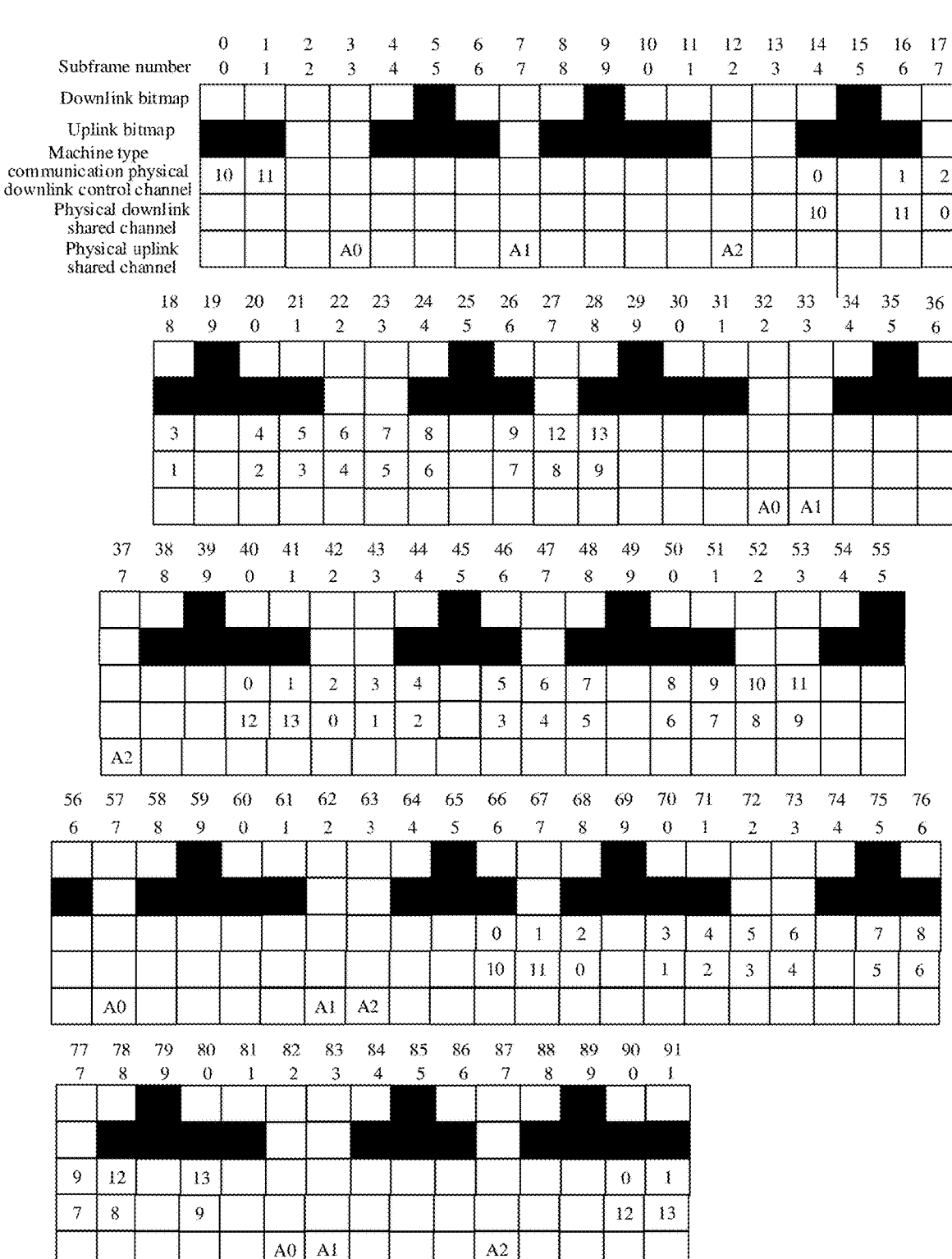
FIG. 11 is a schematic diagram 3 of an application scenario of a communication method according to an embodiment of this application.

For example, refer to FIG. 11. Subframes indicated by black blocks are non-BL/CE subframes. In a case of a bitmap configuration shown in FIG. 11, the network device sends M12 and M13 on a subframe 27 and a subframe 28, and D12 and D13 scheduled by M12 and M13 are located on a subframe 40 and a subframe 41. It can be seen that a PDSCH scheduling delay is 10 downlink BL/CE subframes. The network device sends M10 and M11 on a subframe 52 and a subframe 53, and D10 and D11 scheduled by M10 and M11 are located on a subframe 66 and a subframe 67. It can be seen that a PDSCH scheduling delay is 11 downlink BL/CE subframes. The network device sends M12 and M13 on a subframe 78 and a subframe 80, and D12 and D13 scheduled by M12 and M13 are located on a subframe 90 and a subframe 91. It can be seen that a PDSCH scheduling delay corresponding to D12 is 9 downlink B/CE subframes, and a PDSCH scheduling delay corresponding to D13 is 9 downlink non-BL/CE subframes. The PDSCH scheduling delays of D12 and D13 each is 9 downlink BL/CE subframes.

In the case of the bitmap configuration shown in FIG. 11, scheduling of D12 and D13 presents a specific period, that is, scheduling of D12 and D13 is periodically located on the $0^{th}$ subframe and the $1^{st}$ subframe. In this embodiment of this application, the network device may indicate a delay set {9, 10, 11} to a terminal based on a characteristic of the periodic scheduling, so that the terminal device schedules, based on the delay set, downlink data for transmission.

S302: The network device sends indication information to the terminal device by using higher layer signaling.

Correspondingly, the terminal device receives higher layer signaling from the network device, where the higher layer signaling carries the indication information.

The indication information indicates a delay set.

The higher layer signaling includes, but is not limited to, RRC signaling or media access control (media access control, MAC) signaling. In some embodiments bits may be added to the higher layer signaling, and the added bits are used to configure a delay set for the terminal device. For example, the delay set is {9, 10, 11}. For example, 12 bits are added to the RRC signaling. Four bits are used to configure 9 delays, four bits are used to configure 10 delays, and four bits are used to configure 11 delays.

S303: The network device sends downlink control information to the terminal device on the PDCCH.

Correspondingly, the terminal device receives the downlink control information on the PDCCH.

The downlink control information indicates the first delay and/or the second delay.

In some embodiments a bit is added to the downlink control information, and the added bit indicates the first delay and/or the second delay in the delay set.

Alternatively, an original bit in the downlink control information is reused to indicate the first delay and/or the second delay in the delay set. For example, a repetition number field in the downlink control information indicates one first delay in the delay set. For another example, one first delay and a corresponding second delay in the delay set are jointly indicated by using two bits of the repetition number field and 3 bits of the HARQ-ACK delay field.

For example, the network device configures a delay set {9, 10, 11} for the terminal device by using the higher layer signaling, where 9, 10, and 11 may be values of downlink BL/CE subframes in a PDSCH scheduling delay. The network device indicates, to the terminal device by using the downlink control information, a PDSCH scheduling delay 9 and a corresponding HARQ-ACK delay (for example, 4) in the delay set {9, 10, 11}. In this way, the terminal device may receive downlink data in a corresponding subframe and send the uplink feedback information on the corresponding subframe based on the delay set configured by using the higher layer signaling and the PDSCH scheduling delay 9 and the HARQ-ACK delay that are indicated by the downlink control information. It can be learned that, when the DCI indicates a PDSCH scheduling delay and/or a HARQ-ACK delay to the terminal device, the DCI only needs indicate one or more elements in the delay set without indicating all elements in the delay set. Therefore, signaling overheads of the DCI can be reduced. For example, if the higher layer signaling is RRC signaling, different PDSCH scheduling delays may be indicated corresponding to different bitmaps. For example, when a bitmap 1 is configured, the network device configures, for the terminal device by using the RRC signaling, that a PDSCH scheduling delay is six downlink BL/CE subframes. When a bitmap 2 is configured, the network device configures, for the terminal device by using the RRC signaling, that a PDSCH scheduling delay is five downlink BL/CE subframes. When a bitmap 3 is configured, the network device configures, for the terminal device by using the RRC signaling, that a PDSCH scheduling delay is seven downlink BL/CE subframes. Therefore, subsequently, the network device indicates a specific PDSCH scheduling delay to the terminal device by using the DCI. The DCI may indicate one of the three configured PDSCH scheduling delays (which may be indicated by using only two bits).

In some other embodiments, the DCI may alternatively indicate the delay set to the terminal. For example, the delay set includes the PDSCH scheduling delay. In this case, it usually needs to be considered that a plurality of PDSCH scheduling delays may exist in different configuration bitmaps. Still refer to the foregoing example. The DCI needs to indicate the PDSCH scheduling delay, for example, six downlink BL/CE subframes, when the bitmap 1 is configured. The DCI further needs to indicate the PDSCH scheduling delay (for example, five downlink BL/CE subframes) when the bitmap 2 is configured. The DCI further needs to indicate the PDSCH scheduling delay (for example, seven downlink BL/CE subframes) in the configuration bitmap when the bitmap 3 is configured.

It should be noted that in this embodiment of this application, the first delay and the second delay are mainly described by using an example in which a subframe is a time unit. During actual implementation, the subframe may alternatively be replaced with another time unit.

It may be understood that value ranges of Y4, Y1, Y3, Y2, and Y are listed in the foregoing embodiments. During actual implementation, one or more of these parameters may further have other value ranges. Due to the limitation of space, these value ranges are not exhaustively listed in this embodiment of this application.

Actions of the network device may be performed by the processor 401 and/or the processor 408 in the communication device 400 shown in FIG. 6 by invoking the application program code stored in the memory 403. This is not limited in this embodiment.

It may be understood that, in the embodiments of this application, methods and/or steps implemented by the network device may alternatively be implemented by a component (for example, a chip or a circuit) that can be used in the network device or another component, and methods and/or steps implemented by the terminal device may alternatively be implemented by a component (for example, a chip or a circuit) that can be used in the terminal device or another component.

The foregoing mainly describes the solutions provided in embodiments of this application from a perspective of interaction between network elements. Correspondingly, embodiments of this application further provide a communication apparatus. The communication apparatus may be the network device in the foregoing method embodiments, an apparatus including the foregoing network device, or a component that can be used in the network device. Alternatively, the communication apparatus may be the terminal device in the foregoing method embodiments, an apparatus including the foregoing terminal device, or a component that can be used in the terminal device. It may be understood that, to implement the foregoing functions, the communication apparatus includes a hardware structure and/or a software module for performing a corresponding function. A person skilled in the art should easily be aware that, in combination with units and algorithm steps of the examples described in the embodiments disclosed in this specification, this application may be implemented in a hardware form or in a form of combining hardware with computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12:
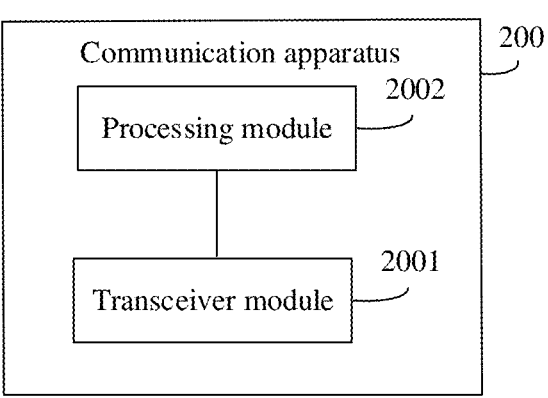
FIG. 12 is a schematic diagram of a structure of a communication apparatus according to an embodiment of this application.

FIG. 12 is a schematic diagram of a structure of a communication apparatus 200. The communication apparatus 200 includes a transceiver module 2001 and a processing module 2002. The transceiver module 2001 may also be referred to as a transceiver unit, and is configured to implement a transceiver function. For example, the transceiver module may be a transceiver circuit, a transceiver machine, a transceiver, or a communication interface. The transceiver module 2001 may perform receiving and sending processing in the foregoing method embodiments, and the processing module 2002 may perform other processing in addition to receiving and sending in the foregoing method embodiments.

For example, the communication apparatus 200 is a chip or another component of the terminal device in the foregoing method embodiments. The transceiver module 2001 may be configured to receive downlink control information, where the downlink control information indicates a first delay; the first delay includes five or six subframes, and the first delay includes a subframe type 1 or a subframe type 2; the subframe type 1 includes the following subframes in sequence: one downlink bandwidth reduced low complexity-coverage enhancement BL/CE subframe, one first subframe, X uplink BL/CE subframes, one second subframe, and one first downlink BL/CE subframe, and the first downlink BL/CE subframe is used to receive a physical downlink shared channel scheduled by a physical downlink control channel; and the subframe type 2 includes the following subframes in sequence: the one first subframe, the X uplink BL/CE subframes, the one second subframe, the first downlink BL/CE subframe, and one second downlink BL/CE subframe, and the second downlink BL/CE subframe is used to receive the physical downlink shared channel scheduled by the physical downlink control channel, where X is 1 or 2.

The processing module 2002 may be configured to determine the first delay based on the downlink control information, and receive downlink data on the physical downlink shared channel based on the first delay via the transceiver module 2001.

For example, the communication apparatus 200 is a chip or another component of the network device in the foregoing method embodiments. The transceiver module 2001 may be configured to send downlink control information, where the downlink control information indicates a first delay; the first delay includes five or six subframes, and the first delay includes a subframe type 1 or a subframe type 2; the subframe type 1 includes the following subframes in sequence: one downlink bandwidth reduced low complexity-coverage enhancement BL/CE subframe, one first subframe, X uplink BL/CE subframes, one second subframe, and one first downlink BL/CE subframe, and the first downlink BL/CE subframe is used to receive a physical downlink shared channel scheduled by a physical downlink control channel; and the subframe type 2 includes the following subframes in sequence: the one first subframe, the X uplink BL/CE subframes, the one second subframe, the first downlink BL/CE subframe, and one second downlink BL/CE subframe, and the second downlink BL/CE subframe is used to receive the physical downlink shared channel scheduled by the physical downlink control channel, where X is 1 or 2.

The processing module 2002 may be further configured to send downlink data on the physical downlink shared channel based on the first delay via the transceiver module 2001.

For example, the communication apparatus 200 is a chip or another component of the terminal device in the foregoing method embodiments. The transceiver module 2001 may be configured to receive downlink control information. The downlink control information indicates a delay. The delay includes the following subframes in sequence: Y-Z-1 downlink bandwidth reduced low complexity-coverage enhancement BL/CE subframes, one subframe, and Z uplink BL/CE subframes, where Y is an integer greater than or equal to 4 and less than or equal to 13, and Z is 1, 2, or 3.

The processing module 2002 may be configured to determine the delay based on the downlink control information, and send, on the last uplink BL/CE subframe of the Z uplink BL/CE subframes based on the delay via the transceiver module 2001, uplink feedback information corresponding to a physical downlink shared channel.

For example, the communication apparatus 200 is a chip or another component of the network device in the foregoing method embodiments. The transceiver module 2001 may be configured to send downlink control information. The downlink control information indicates a delay. The delay includes the following subframes in sequence: Y-Z-1 downlink bandwidth reduced low complexity-coverage enhancement BL/CE subframes, one subframe, and Z uplink BL/CE subframes, where Y is an integer greater than or equal to 4 and less than or equal to 13, and Z is 1, 2, or 3.

The processing module 2002 may be further configured to receive, on the last uplink BL/CE subframe of the Z uplink BL/CE subframes based on the delay via the transceiver module 2001, uplink feedback information corresponding to a physical downlink shared channel.

For example, the communication apparatus 200 is a chip or another component of the terminal device in the foregoing method embodiments. The transceiver module 2001 may be configured to receive downlink control information.

The processing module 2002 may be configured to determine a delay based on the downlink control information, and send uplink feedback information on the last uplink BL/CE subframe of Z uplink BL/CE subframes based on the delay via the transceiver module 2001.

The downlink control information indicates a delay. The delay includes the following subframes in sequence: Y4 downlink BL/CE subframes, one seventh subframe, one uplink BL/CE subframe, one eighth subframe, Y1 downlink BL/CE subframes, one third subframe, one uplink BL/CE subframe, one ninth subframe, Y3 downlink BL/CE subframes, one sixth subframe, one uplink BL/CE subframe, one fourth subframe, Y2 downlink BL/CE subframes, one fifth subframe, and the Z uplink BL/CE subframes, where Y4, Y1, Y3, Y2, and Y are non-negative integers, and Y is 21 or 22; and Z is 1, 2, or 3. In some embodiments Y4, Y1, Y3, and Y2 meet: Y4+Y1+Y3+Y2=Y−10−Z.

Alternatively, the delay includes the following subframes in sequence: Y4 downlink BL/CE subframes, one seventh subframe, Y2 downlink BL/CE subframes, one fifth subframe, and the Z uplink BL/CE subframes, where Y4, Y2, and Y are non-negative integers; Y is greater than or equal to 11, and Y is less than or equal to 18; and Z is 1, 2, or 3.

For example, the communication apparatus 200 is a chip or another component of the network device in the foregoing method embodiments. The transceiver module 2001 may be configured to send downlink control information, where the downlink control information indicates a delay.

The processing module 2002 may be configured to receive uplink feedback information (ACK/NACK) in the last uplink BL/CE subframe of Z uplink BL/CE subframes based on the delay via the transceiver module 2001.

The delay includes the following subframes in sequence: Y4 downlink BL/CE subframes, one seventh subframe, one uplink BL/CE subframe, one eighth subframe, Y1 downlink BL/CE subframes, one third subframe, one uplink BL/CE subframe, one ninth subframe, Y3 downlink BL/CE subframes, one sixth subframe, one uplink BL/CE subframe, one fourth subframe, Y2 downlink BL/CE subframes, one fifth subframe, and the Z uplink BL/CE subframes, where Y4, Y1, Y3, Y2, and Y are non-negative integers, and Y is 21 or 22; and Z is 1, 2, or 3. In some embodiments Y4, Y1, Y3, and Y2 meet: Y4+Y1+Y3+Y2=Y−10−Z.

Alternatively, the delay includes the following subframes in sequence: Y4 downlink BL/CE subframes, one seventh subframe, Y2 downlink BL/CE subframes, one fifth subframe, and the Z uplink BL/CE subframes, where Y4, Y2, and Y are non-negative integers; Y is greater than or equal to 11, and Y is less than or equal to 18; and Z is 1, 2, or 3.

For example, the communication apparatus 200 is a chip or another component of the terminal device in the foregoing method embodiments. The transceiver module 2001 may be configured to receive downlink control information.

The processing module 2002 may be configured to determine a delay based on the downlink control information, and send uplink feedback information on the last uplink BL/CE subframe of Z uplink BL/CE subframes based on the delay via the transceiver module 2001.

The downlink control information indicates the delay. The delay includes the following subframes in sequence: Y1 downlink BL/CE subframes, one third subframe, two uplink BL/CE subframes, one fourth subframe, Y2 downlink BL/CE subframes, one fifth subframe, and the Z uplink BL/CE subframes, where Y1, Y2, Y, and Z are non-negative integers; Y is greater than or equal to 10, and Y is less than or equal to 17; and Z is 1, 2, or 3.

For example, the communication apparatus 200 is a chip or another component of the network device in the foregoing method embodiments. The transceiver module 2001 may be configured to send downlink control information, where the downlink control information indicates a delay.

The processing module 2002 may be configured to send uplink feedback information on the last uplink BL/CE subframe of Z uplink BL/CE subframes based on the delay via the transceiver module 2001.

The delay includes the following subframes in sequence: Y1 downlink BL/CE subframes, one third subframe, two uplink BL/CE subframes, one fourth subframe, Y2 downlink BL/CE subframes, one fifth subframe, and the Z uplink BL/CE subframes, where Y1, Y2, Y, and Z are non-negative integers; Y is greater than or equal to 10, and Y is less than or equal to 17; and Z is 1, 2, or 3.

For example, the communication apparatus 200 is a chip or another component of the terminal device in the foregoing method embodiments. The transceiver module 2001 may be configured to receive downlink control information.

The processing module 2002 may be configured to determine a delay based on the downlink control information, and send uplink feedback information on the last uplink BL/CE subframe of Z uplink BL/CE subframes based on the delay via the transceiver module 2001.

The downlink control information indicates a delay. The delay includes the following subframes in sequence: Y3 downlink BL/CE subframes, one sixth subframe, one uplink BL/CE subframe, one fourth subframe, Y2 downlink BL/CE subframes, one fifth subframe, and the Z uplink BL/CE subframes, where Y3, Y2, and Y meet: Y3+Y2=Y−4−Z; Y3, Y2, and Y are non-negative integers; Y is greater than or equal to 10, and Y is less than or equal to 16; and Z is 1, 2, or 3.

For example, the communication apparatus 200 is a chip or another component of the network device in the foregoing method embodiments. The transceiver module 2001 may be configured to send downlink control information, where the downlink control information indicates a delay.

The processing module 2002 may be configured to send uplink feedback information on the last uplink BL/CE subframe of Z uplink BL/CE subframes based on the delay via the transceiver module 2001.

The delay includes the following subframes in sequence: Y3 downlink BL/CE subframes, one sixth subframe, one uplink BL/CE subframe, one fourth subframe, Y2 downlink BL/CE subframes, one fifth subframe, and the Z uplink BL/CE subframes, where Y3 and Y2 meet: Y3+Y2=Y−4−Z; Y3, Y2, and Y are non-negative integers; Y is greater than or equal to 10, and Y is less than or equal to 16; and Z is 1, 2, or 3.

For example, the communication apparatus 200 is a chip or another component of the network device in the foregoing method embodiments. The processing module 2002 may be configured to determine a delay set based on a configured bitmap. The delay set includes a first delay and/or a second delay.

The transceiver module 2001 may be configured to send indication information to a terminal device by using higher layer signaling, where the indication information indicates the delay set.

The transceiver module 2001 may be further configured to send downlink control information to the terminal device on a physical downlink control channel, where the downlink control information indicates the first delay and/or the second delay.

For example, the communication apparatus 200 is a chip or another component of the terminal device in the foregoing method embodiments. The transceiver module 2001 may be configured to receive higher layer signaling from a network device. The higher layer signaling includes indication information, and the indication information indicates a delay set. The delay set includes a first delay and/or a second delay.

The transceiver module 2001 may be further configured to receive downlink control information on a physical downlink control channel, where the downlink control information indicates a first delay and/or a second delay.

All related content of the steps in the foregoing method embodiments may be cited in function descriptions of the corresponding functional modules. Details are not described herein again.

In this embodiment, the communication apparatus 200 is presented in a form of functional modules obtained through integration. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the communication apparatus 200 may be in a form of the communication device 400 shown in FIG. 6.

For example, the processor 401 and/or the processor 408 in the communication device 400 shown in FIG. 6 may invoke computer-executable instructions stored in the memory 403, so that the communication device 400 performs the communication methods in the foregoing method embodiments.

Specifically, functions/implementation processes of the transceiver module 2001 and the processing module 2002 in FIG. 12 may be implemented by the processor 401 and/or the processor 408 in the communication device 400 shown in FIG. 6 by invoking the computer-executable instructions stored in the memory 403. Alternatively, functions/implementation processes of the processing module 2002 in FIG. 12 may be implemented by the processor 401 and/or the processor 408 in the communication device 400 shown in FIG. 6 by invoking the computer-executable instructions stored in the memory 403, and functions/implementation processes of the transceiver module 2001 in FIG. 12 may be implemented by the communication interface 404 in the communication device 400 shown in FIG. 6.

The communication apparatus 200 provided in this embodiment can perform the foregoing communication method. Therefore, for technical effects that can be achieved by the communication apparatus 200, refer to the foregoing method embodiments. Details are not described herein again.

It should be noted that one or more of the foregoing modules or units may be implemented by software, hardware, or a combination thereof. When any one of the foregoing modules or units is implemented by using software, the software exists in a form of computer program instructions, and is stored in a memory. A processor may be configured to execute the program instructions and implement the foregoing method procedures. The processor may be built into a SoC (system-on-a-chip) or an ASIC, or may be an independent semiconductor chip. In addition to cores used to execute software instructions to perform operations or processing, the processor may further include a necessary hardware accelerator, such as a field programmable gate array (field programmable gate array, FPGA), a PLD (programmable logic device), or a logic circuit implementing a dedicated logical operation.

When the foregoing modules or units are implemented by using hardware, the hardware may be any one or any combination of a CPU, a microprocessor, a digital signal processing (digital signal processing, DSP) chip, a microcontroller unit (microcontroller unit, MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

In some embodiments an embodiment of this application further provides a communication apparatus (for example, the communication apparatus may be a chip or a chip system). The communication apparatus includes a processor, configured to implement the method in any one of the foregoing method embodiments. In a possible implementation, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. When the communication apparatus is a chip system, the communication device may include a chip, or may include a chip and another discrete component. This is not specifically limited in this embodiment of this application.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" (comprising) does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the scope of this application. This application is intended to cover these modifications and variations of this application provided that they fall within the protection scope defined by the following claims and their equivalent technologies.

What is claimed is:

1. A communication method, comprising:

receiving downlink control information (DCI), wherein the DCI indicates a second delay of uplink feedback information of a physical downlink shared channel scheduled by a physical downlink control channel, and the second delay comprises the following subframes in sequence:

Y-Z-1 downlink bandwidth reduced low complexity-coverage enhancement (BL/CE) subframes, one subframe, and Z uplink BL/CE subframes, wherein Y is an integer greater than or equal to 4 and less than or equal to 13, and Z is an integer equal to 1, 2, or 3;

determining the second delay based on the DCI; and sending, on a last uplink BL/CE subframe of the Z uplink BL/CE subframes based on the second delay, the uplink feedback information corresponding to the physical downlink shared channel.

2. The method according to claim 1, wherein the DCI comprises an existing field that is reused to indicate the second delay.

3. The method according to claim 1, wherein the DCI further indicates a first delay of the physical downlink shared channel scheduled by the physical downlink control channel.

4. The method according to claim 3, wherein the DCI comprises an existing field that is reused to indicate the first delay.

5. The method according to claim 3, wherein the first delay is associated with the second delay, and the DCI indicates both the first delay and the second delay.

6. The method according to claim 5, wherein the first delay is associated with the second delay comprises the first delay being associated with a plurality of second delays in response to the first delay being seven subframes or two downlink BL/CE subframes; and the DCI indicates both the first delay and the second delay comprises the DCI indicating the plurality of second delays in response to the DCI indicating that the first delay is the seven subframes or the two downlink BL/CE subframes.

7. A communication method, comprising:

sending downlink control information (DCI), wherein the DCI indicates a second delay of uplink feedback information of a physical downlink shared channel scheduled by a physical downlink control channel, and the delay comprises the following subframes in sequence:

Y-Z-1 downlink bandwidth reduced low complexity-coverage enhancement (BL/CE) subframes, one subframe, and Z uplink BL/CE subframes, wherein Y is an integer greater than or equal to 4 and less than or equal to 13, and Z is an integer equal to 1, 2, or 3; and receiving, on a last uplink BL/CE subframe of the Z uplink BL/CE subframes based on the second delay, the uplink feedback information corresponding to the physical downlink shared channel.

8. The method according to claim 7, wherein the DCI comprises an existing field that is reused to indicate the second delay.

9. The method according to claim 7, wherein the DCI further indicates a first delay of the physical downlink shared channel scheduled by the physical downlink control channel.

10. The method according to claim 9, wherein the DCI comprises an existing field that is reused to indicate the first delay.

11. The method according to claim 7, wherein the first delay is associated with the second delay, and the DCI indicates both the first delay and the second delay.

12. The method according to claim 11, wherein the first delay is associated with the second delay comprises the first delay being associated with a plurality of second delays in response to the first delay being seven subframes or two downlink BL/CE subframes; and the DCI indicates both the first delay and the second delay comprises the DCI indicating the plurality of second delays in response to the DCI indicating that the first delay is the seven subframes or the two downlink BL/CE subframes.

13. A communication apparatus, comprising:

a memory configured to store non-transitory instructions; and at least one processor coupled with the memory, the at least one processor configured to execute the non-transitory instructions, thereby causing the communication apparatus to:

receive downlink control information (DCI), wherein the DCI indicates a second delay, and the second delay comprises the following subframes in sequence:

Y-Z-1 downlink bandwidth reduced low complexity-coverage enhancement (BL/CE) subframes, one subframe, and Z uplink BL/CE subframes, wherein Y is an integer greater than or equal to 4 and less than or equal to 13, and Z is an integer equal to 1, 2, or 3; and determine the second delay based on the DCI, and send, on a last uplink BL/CE subframe of the Z uplink BL/CE subframes based on the second delay by a transceiver, uplink feedback information corresponding to a physical downlink shared channel.

14. The apparatus according to claim 13, wherein the DCI further indicates a first delay of the physical downlink shared channel scheduled by a physical downlink control channel.

15. The apparatus according to claim 14, wherein the first delay is associated with the second delay, and the DCI indicates both the first delay and the second delay.

16. The apparatus according to claim 15, wherein the first delay is associated with the second delay comprises the first delay being associated with a plurality of second delays in response to the first delay being seven subframes or two downlink BL/CE subframes; and the DCI indicates both the first delay and the second delay comprises the DCI indicating the plurality of second delays in response to the DCI indicating that the first delay is the seven subframes or the two downlink BL/CE subframes.

17. A communication apparatus, comprising:

a memory configured to store non-transitory instructions; and at least one processor coupled with the memory, the at least one processor configured to execute the non-transitory instructions, thereby causing the communication apparatus to:

send downlink control information (DCI), wherein the DCI indicates a second delay, and the second delay comprises the following subframes in sequence:

Y-Z-1 downlink bandwidth reduced low complexity-coverage enhancement (BL/CE) subframes, one subframe, and Z uplink BL/CE subframes, wherein Y is an integer greater than or equal to 4 and less than or equal to 13, and Z is an integer equal to 1, 2, or 3; and receive, on a last uplink BL/CE subframe of the Z uplink BL/CE subframes based on the second delay by a transceiver, uplink feedback information corresponding to a physical downlink shared channel.

18. The apparatus according to claim 17, wherein the DCI further indicates a first delay of the physical downlink shared channel scheduled by a physical downlink control channel.

19. The apparatus according to claim 17, wherein the first delay is associated with the second delay, and the DCI indicates both the first delay and the second delay.

20. The apparatus according to claim 19, wherein the first delay is associated with the second delay comprises the first delay being associated with a plurality of second delays in response to the first delay being seven subframes or two downlink BL/CE subframes; and the DCI indicates both the first delay and the second delay comprises the DCI indicating the plurality of second delays in response to the DCI indicating that the first delay is the seven subframes or the two downlink BL/CE subframes.

* * * * *